United States Patent
Amini et al.

(10) Patent No.: US 8,953,659 B2
(45) Date of Patent: Feb. 10, 2015

(54) RESPONSE FRAME MODULATION CODING SET (MCS) SELECTION WITHIN SINGLE USER, MULTIPLE USER, MULTIPLE ACCESS, AND/OR MIMO WIRELESS COMMUNICATIONS

(75) Inventors: Peiman Amini, Mountain View, CA (US); Matthew James Fischer, Mountain View, CA (US)

(73) Assignee: Broadcom Corporation, Irvine, CA (US)

(*) Notice: Subject to any disclaimer, the term of this patent is extended or adjusted under 35 U.S.C. 154(b) by 123 days.

(21) Appl. No.: 13/524,888

(22) Filed: Jun. 15, 2012

(65) Prior Publication Data

US 2013/0010844 A1 Jan. 10, 2013

Related U.S. Application Data

(60) Provisional application No. 61/505,054, filed on Jul. 6, 2011, provisional application No. 61/509,056, filed on Jul. 18, 2011.

(51) Int. Cl.
| | | |
|---|---|---|
| H04B 1/38 | (2006.01) | |
| H04L 5/16 | (2006.01) | |
| H04L 1/00 | (2006.01) | |

(52) U.S. Cl.
CPC ............ H04L 1/0036 (2013.01); H04L 1/0015 (2013.01)
USPC ......................................................... 375/219

(58) Field of Classification Search
USPC .................................. 375/219; 370/328, 331
See application file for complete search history.

(56) References Cited

U.S. PATENT DOCUMENTS

| | | | |
|---|---|---|---|
| 2002/0141362 A1* | 10/2002 | Hsu et al. ....................... | 370/331 |
| 2007/0147535 A1 | 6/2007 | Niu et al. | |
| 2008/0013505 A1* | 1/2008 | Trainin ........................ | 370/338 |

(Continued)

FOREIGN PATENT DOCUMENTS

| | | |
|---|---|---|
| CN | 101335590 A | 12/2008 |
| EP | 1983676 A1 | 10/2008 |

(Continued)

OTHER PUBLICATIONS

European Patent Office; European Search Report; EP Application No. 12004932.5; Aug. 28, 2013; 3 pgs.

*Primary Examiner* — Tanmay Shah
(74) *Attorney, Agent, or Firm* — Garlick & Markison; Shayne X. Short

(57) ABSTRACT

Response frame modulation coding set (MCS) selection within single user, multiple user, multiple access, and/or MIMO wireless communications. With respect to any exchange between communication devices in which there is a response frame, a first frame (e.g., an eliciting frame) is a first transmitted from the eliciting communication device to the responding communication device, and a second frame (e.g., a response frame) is transmitted from the responding communication device to the eliciting communities device. Appropriate selection of MCS to be used within the response frame may be determined explicitly or implicitly. One or more parameters (e.g., a limit parameter, a reduction parameter, etc.) may be used to determine the MCS of the response frame. The MCS employed for a response frame may be selected from a basic MCS set that ensures all response frames from any responding communication device may be properly received by the eliciting communication device.

20 Claims, 29 Drawing Sheets

(56) References Cited

U.S. PATENT DOCUMENTS

2010/0303025 A1  12/2010  Park et al.
2012/0140708 A1* 6/2012  Choudhury et al. .......... 370/328

FOREIGN PATENT DOCUMENTS

| JP | 2004536505 A | 12/2004 |
| KR | 1020030094786 A | 12/2003 |

* cited by examiner

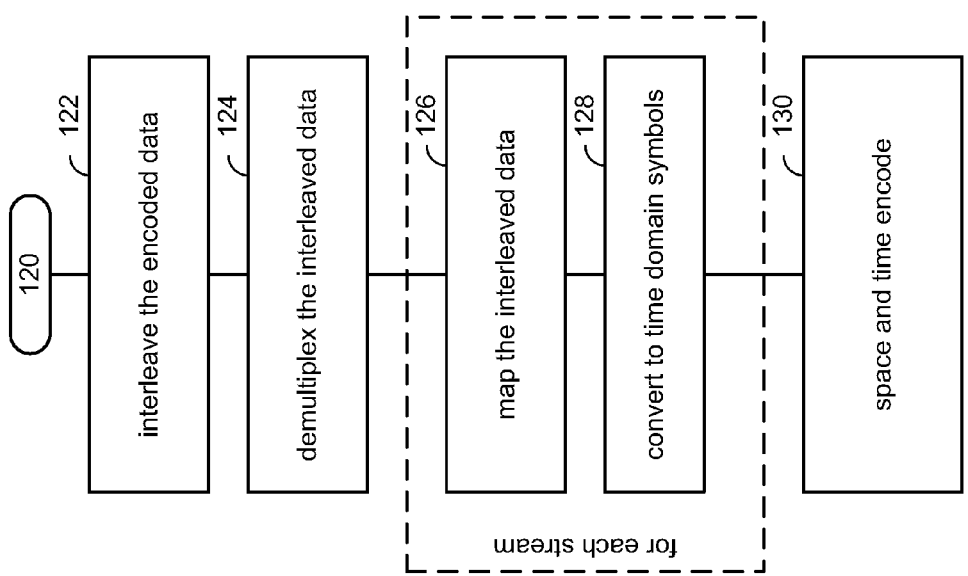

• parameter R, L operational mode

- eliciting node based determination
  - different basic MCS sets for different nodes (a basic MCS set may include more than one node)

• responding node based determination

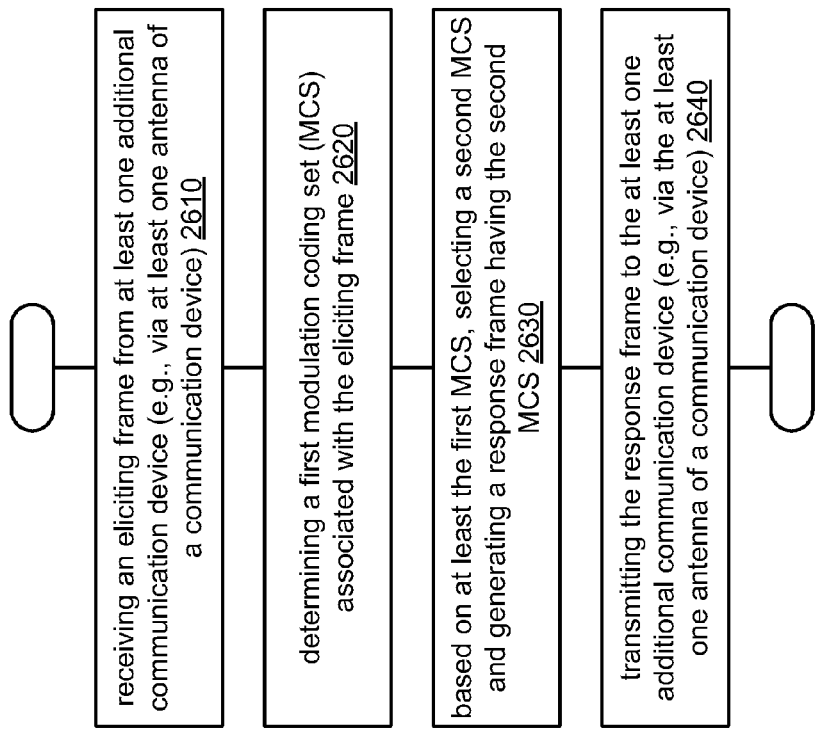

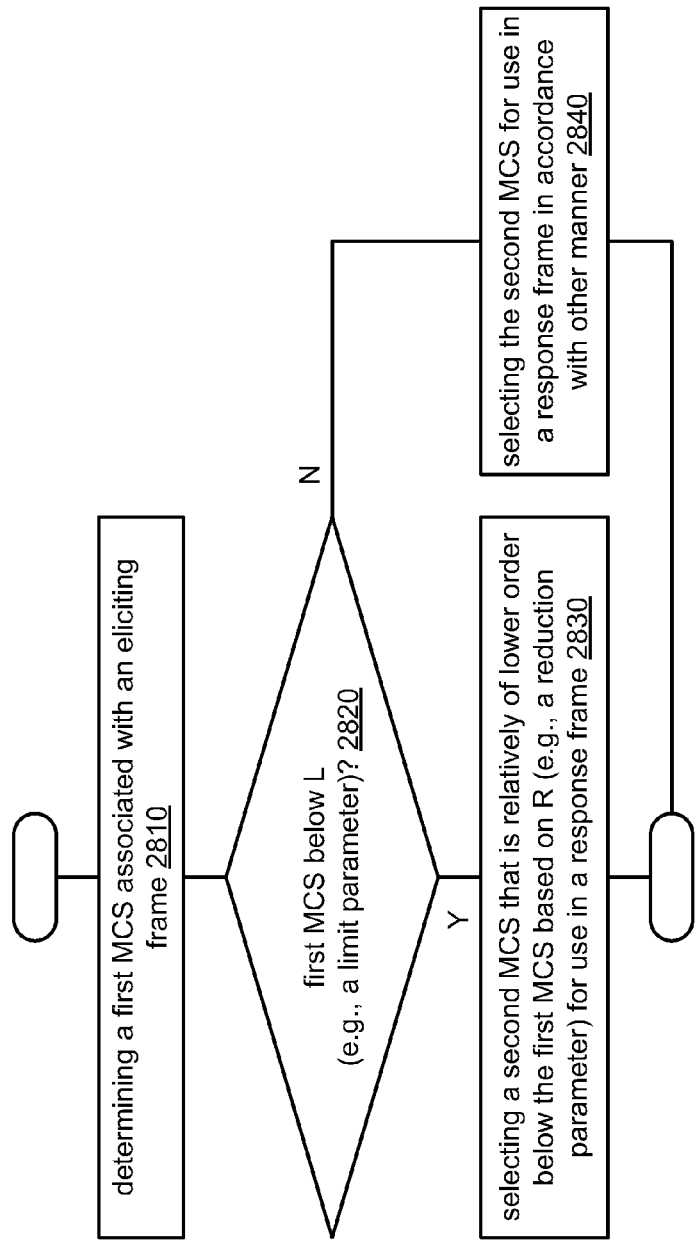

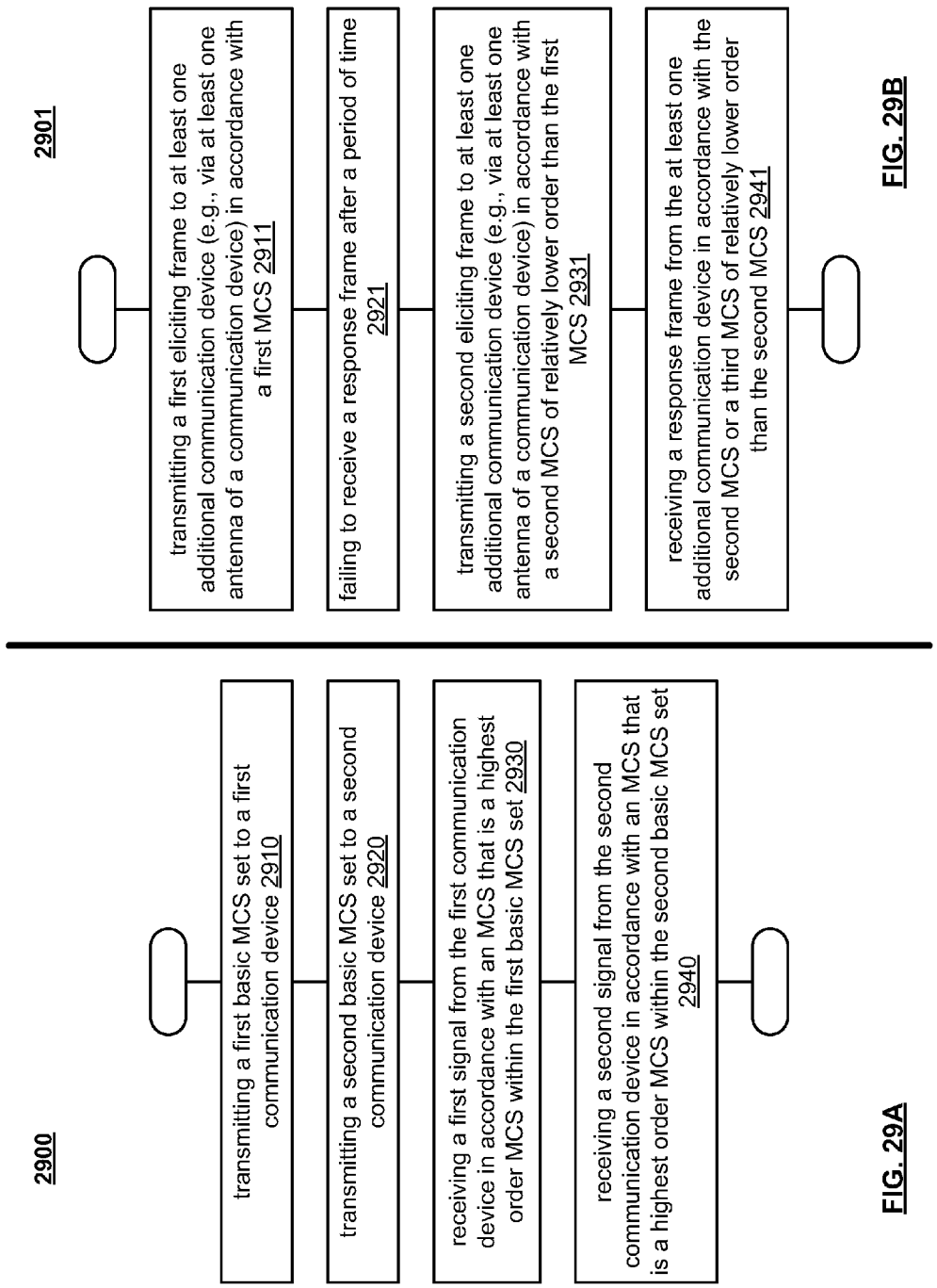

ced herein by reference in their entirety and made part of the present U.S. Utility patent application for all purposes:

RESPONSE FRAME MODULATION CODING SET (MCS) SELECTION WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional patent applications which are hereby incorporated herein by reference in their entirety and made part of the present U.S. Utility patent application for all purposes:

1. U.S. Provisional Patent Application Ser. No. 61/505,054, entitled "Response frame modulation coding set (MCS) selection within single user, multiple user, multiple access, and/or MIMO wireless communications," filed Jul. 6, 2011, pending.

2. U.S. Provisional Patent Application Ser. No. 61/509,056, entitled "Response frame modulation coding set (MCS) selection within single user, multiple user, multiple access, and/or MIMO wireless communications," filed Jul. 18, 2011, pending.

INCORPORATION BY REFERENCE

The following IEEE standards/draft IEEE standards are hereby incorporated herein by reference in their entirety and are made part of the present U.S. Utility patent application for all purposes:

1. IEEE Std 802.11™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, Sponsored by the LAN/MAN Standards Committee, IEEE Std 802.11™-2012, (Revision of IEEE Std 802.11-2007), 2793 total pages (incl. pp. i-xcvi, 1-2695).

2. IEEE Std 802.11n™-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11™-2007 as amended by IEEE Std 802.11k™-2008, IEEE Std 802.11r™-2008, IEEE Std 802.11y™-2008, and IEEE Std 802.11r™-2009), 536 total pages (incl. pp. i-xxxii, 1-502).

3. IEEE Draft P802.11-REVmb™/D12, November 2011 (Revision of IEEE Std 802.11™-2007 as amended by IEEE Std 802.11k™-2008, IEEE Std 802.11r™-2008, IEEE Std 802.11y™-2008, IEEE Std 802.11w™-2009, IEEE Std 802.11n™-2009, IEEE Std 802.11p™-2010, IEEE Std 802.11z™-2010, IEEE Std 802.11v™-2011, IEEE Std 802.11u™-2011, and IEEE Std 802.11s™-2011), "IEEE Standard for Information technology—Telecommunications and information exchange between systems—Local and metropolitan area networks—Specific requirements; Part 11: Wireless LAN Medium Access Control (MAC) and Physical Layer (PHY) Specifications," Prepared by the 802.11 Working Group of the LAN/MAN Standards Committee of the IEEE Computer Society, 2910 total pages (incl. pp. i-cxxviii, 1-2782).

4. IEEE P802.11ac™/D2.1, March 2012, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338).

5. IEEE P802.11ad™/D6.0, March 2012, (Draft Amendment based on IEEE P802.11REVmb D12.0), (Amendment to IEEE P802.11REVmb D12.0 as amended by IEEE 802.11ae D8.0 and IEEE 802.11aa D9.0), "IEEE P802.11ad™/D6.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," Sponsor: IEEE 802.11 Committee of the IEEE Computer Society, IEEE-SA Standards Board, 664 total pages.

6. IEEE Std 802.11ae™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11ae™-2012, (Amendment to IEEE Std 802.11™-2012), 52 total pages (incl. pp. i-xii, 1-38).

7. IEEE P802.11af™/D1.06, March 2012, (Amendment to IEEE Std 802.11REVmb™/D12.0 as amended by IEEE Std 802.11ae™/D8.0, IEEE Std 802.11aa™/D9.0, IEEE Std 802.11ad™/D5.0, and IEEE Std 802.11ac™/D2.0), "Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 140 total pages (incl. pp. i-xxii, 1-118).

BACKGROUND OF THE INVENTION

1. Technical Field of the Invention

The invention relates generally to communication systems; and, more particularly, it relates to selection of modulation coding set (MCS) and associated communication parameters employed by various communication devices operative within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera, communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802, 11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIG. 6 is a diagram illustrating an embodiment of a method that further defines Step 120 of FIG. 5.

FIG. 26, FIG. 27A, FIG. 27B, FIG. 28, FIG. 29A, and FIG. 29B illustrate various embodiments of methods performed by one or more communication devices.

DETAILED DESCRIPTION OF THE INVENTION

Figure 1:
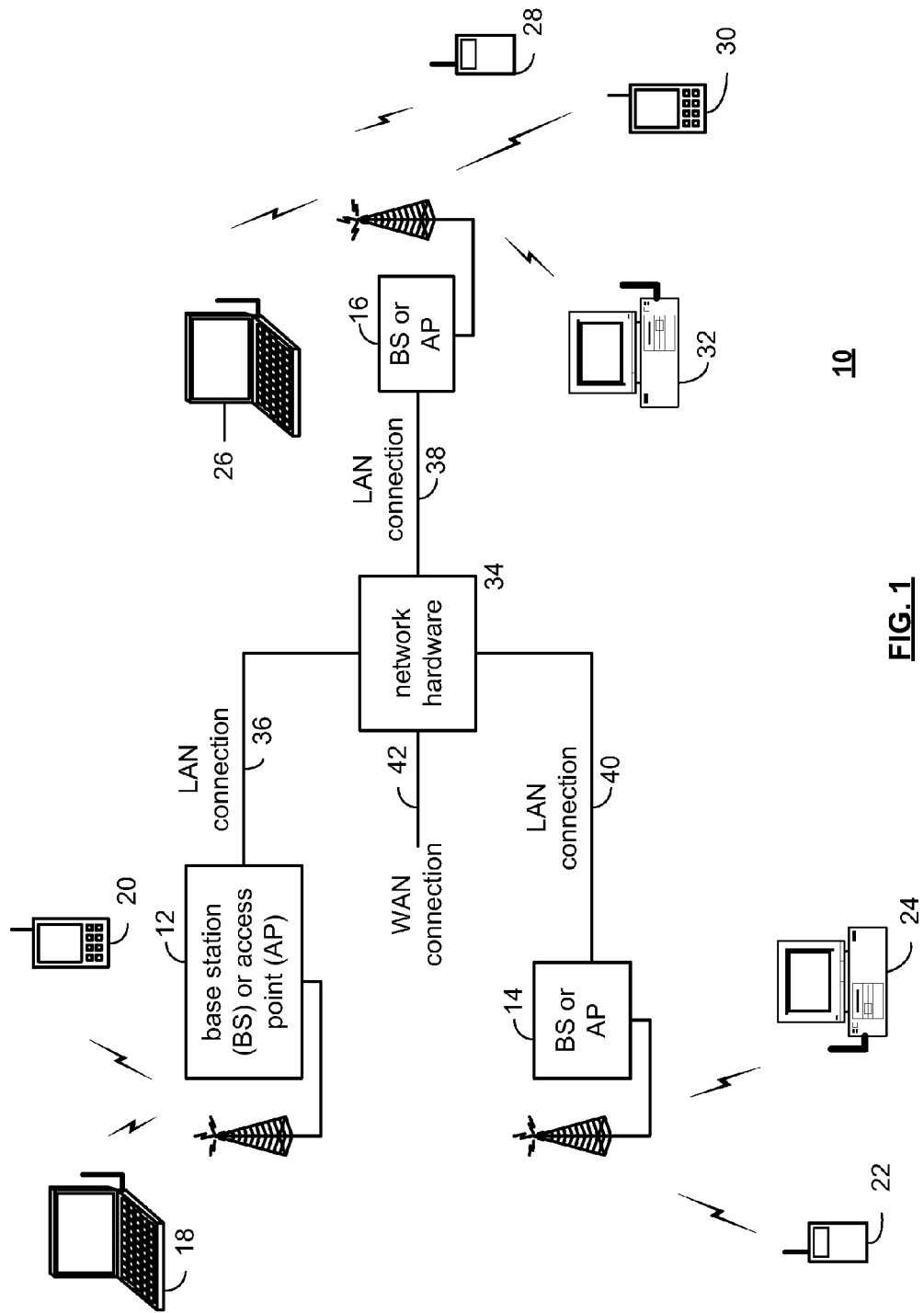
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera, provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication device may operate in accordance with the various aspects of the invention as presented herein to enhance performance, reduce costs, reduce size, and/or enhance broadband applications.

Figure 2:
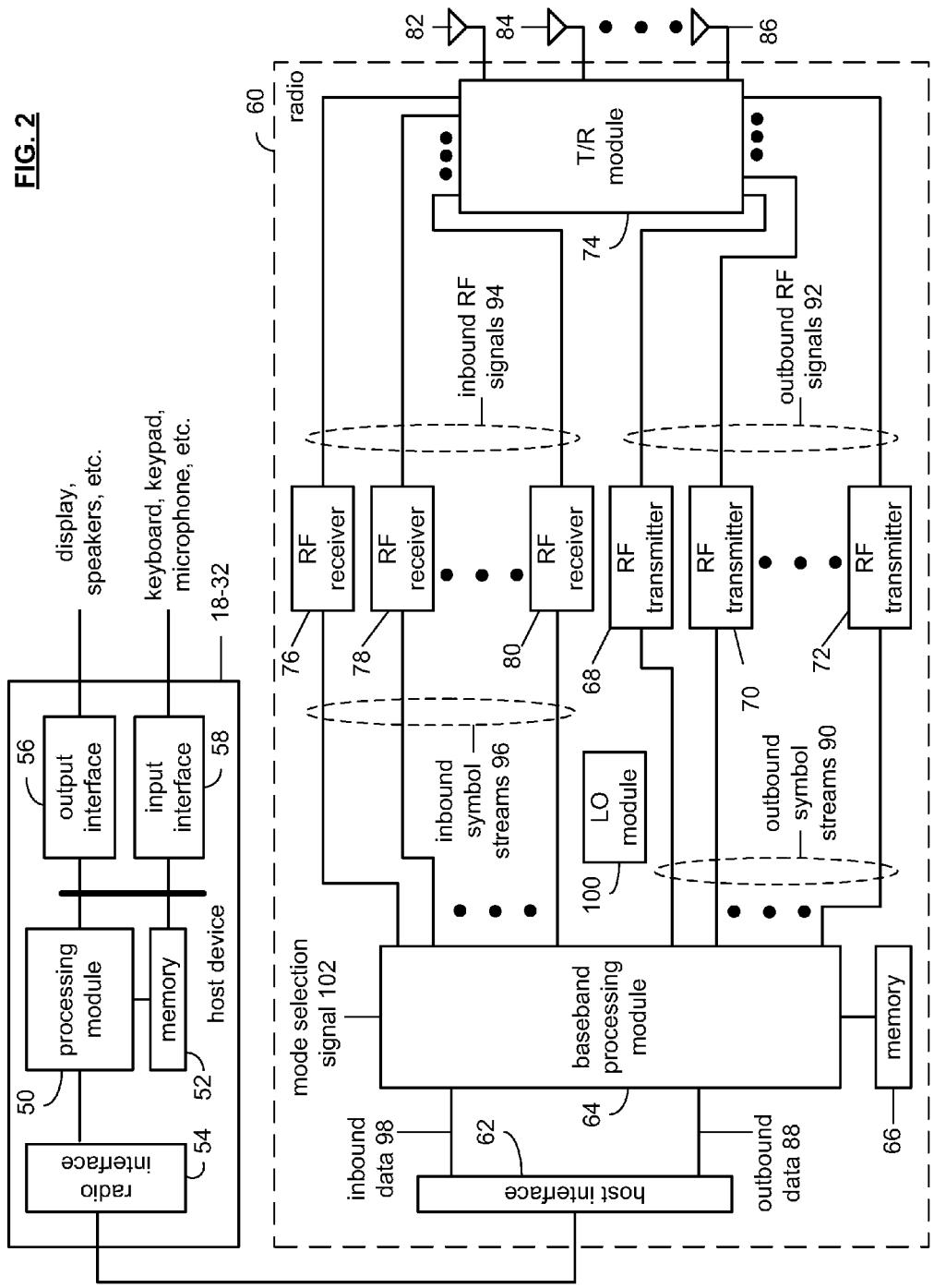
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), and data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 60 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
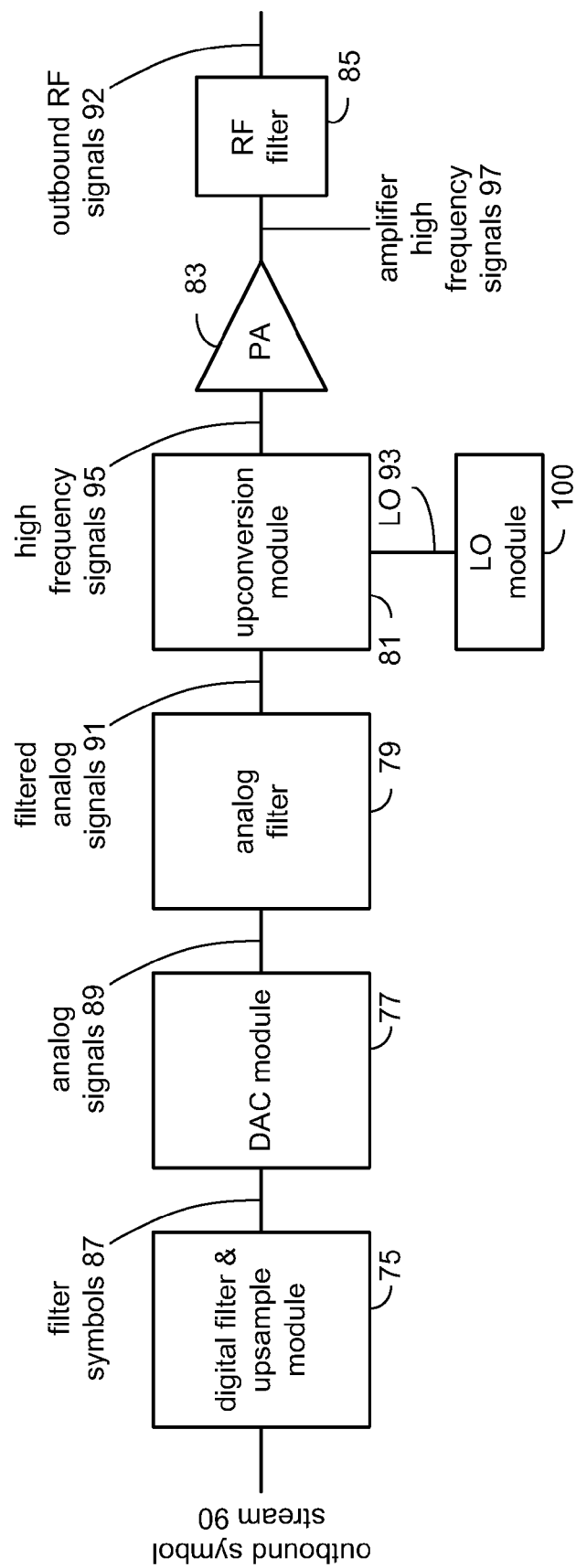
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
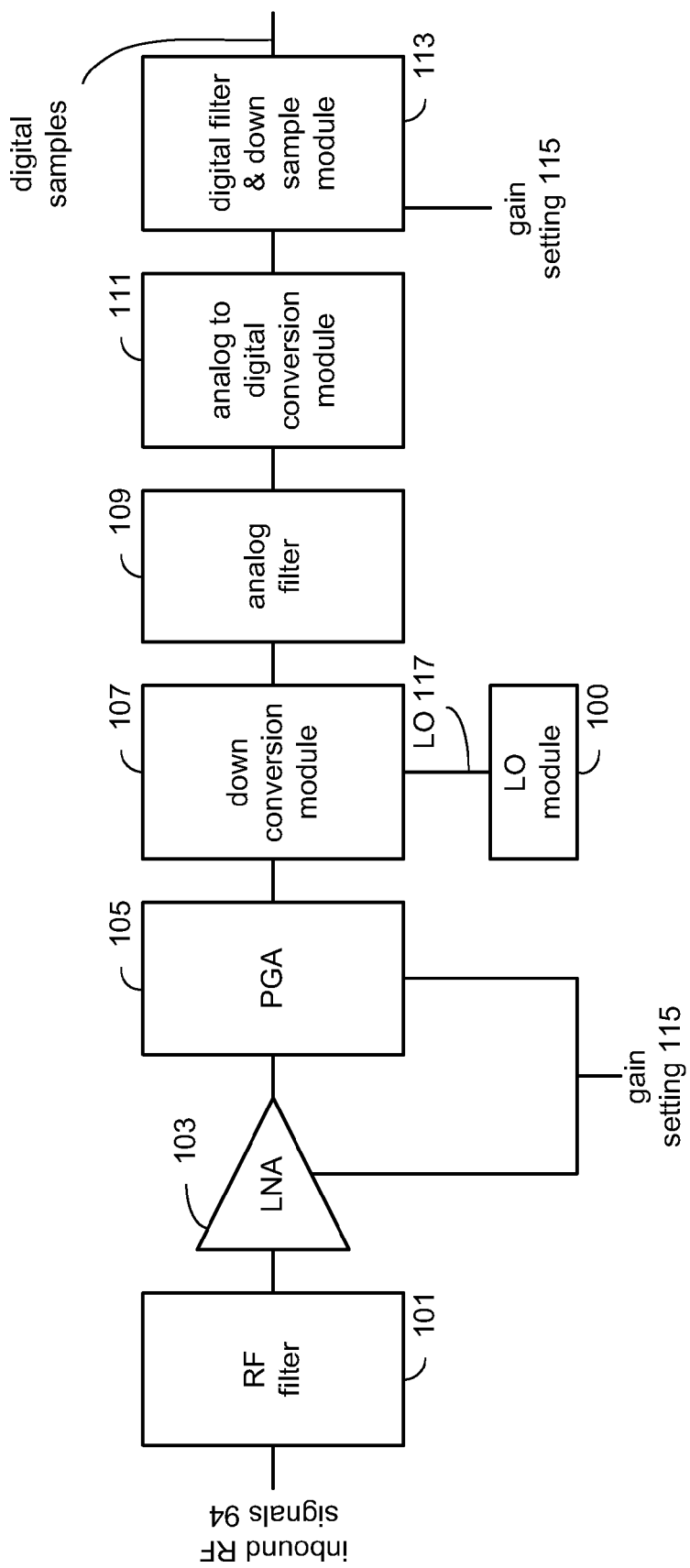
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
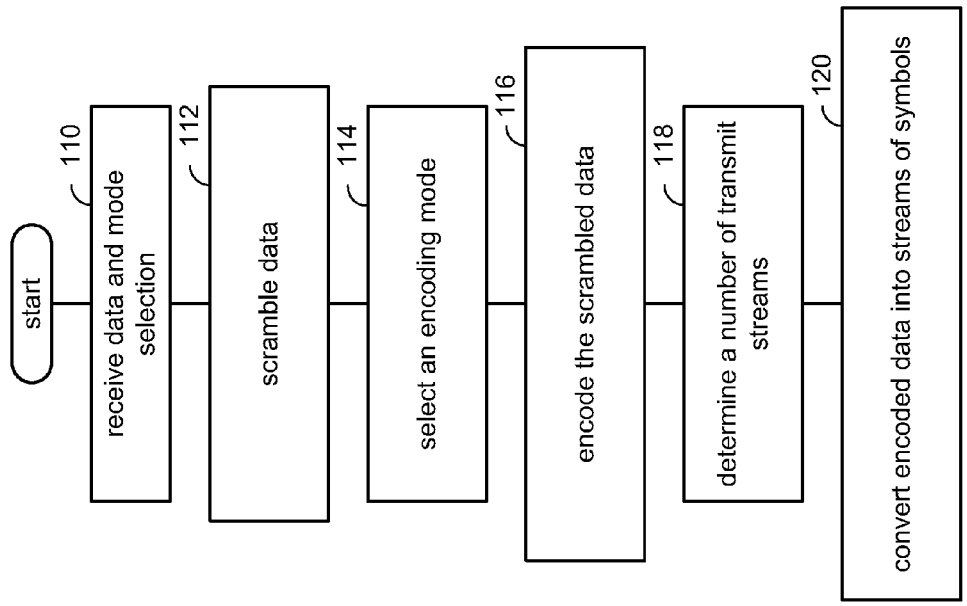
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
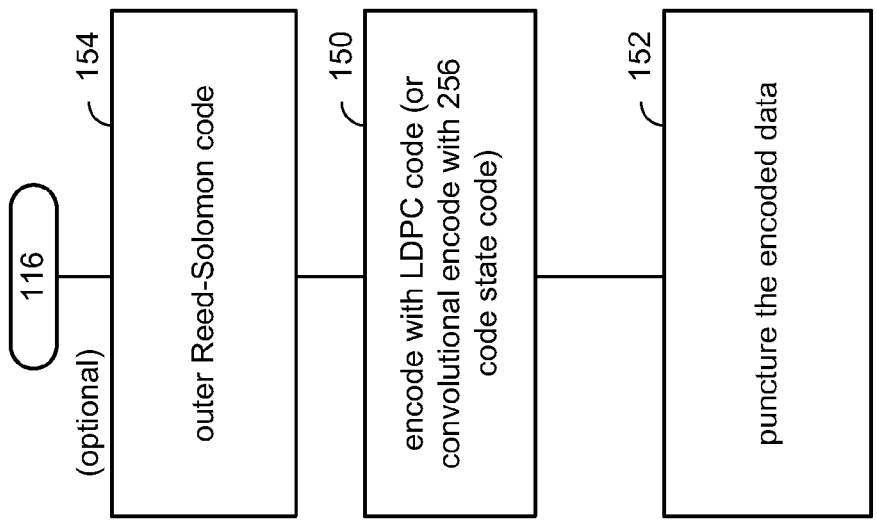
FIGS. 7-9 are diagrams illustrating various embodiments for encoding the scrambled data.
Figure 8:
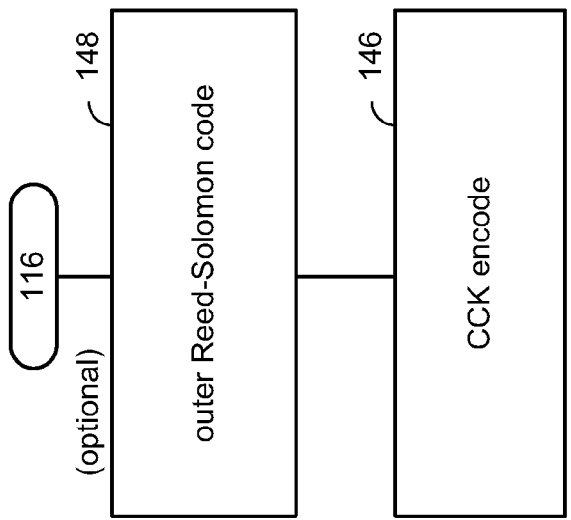
Figure 7:
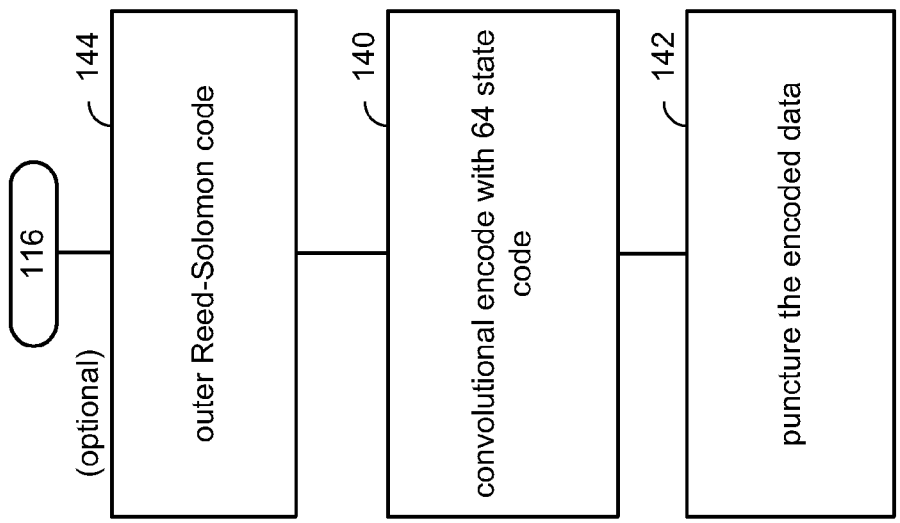

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
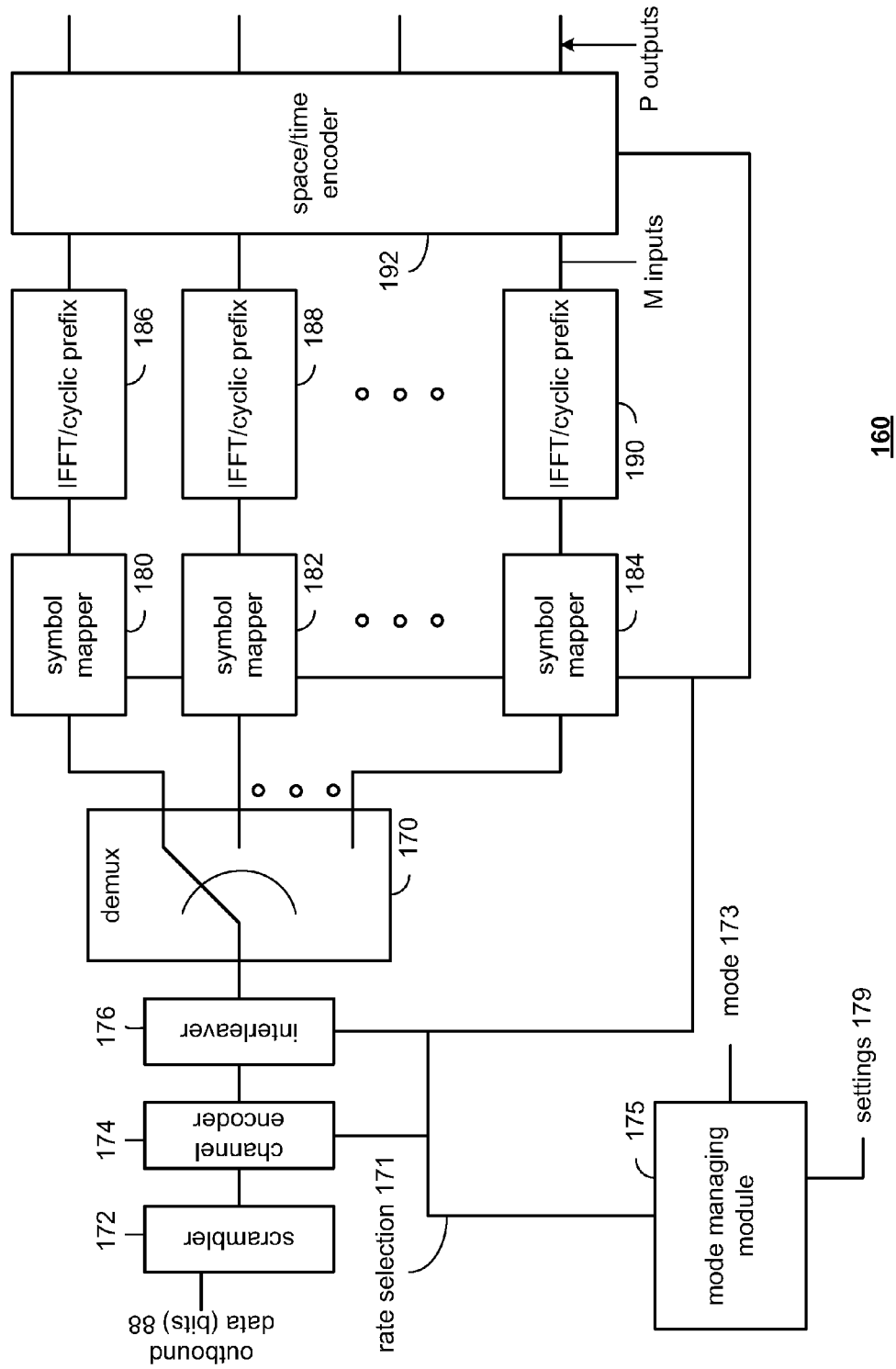
FIGS. 10A and 10B are diagrams illustrating embodiments of a radio transmitter.
Figure 10B:
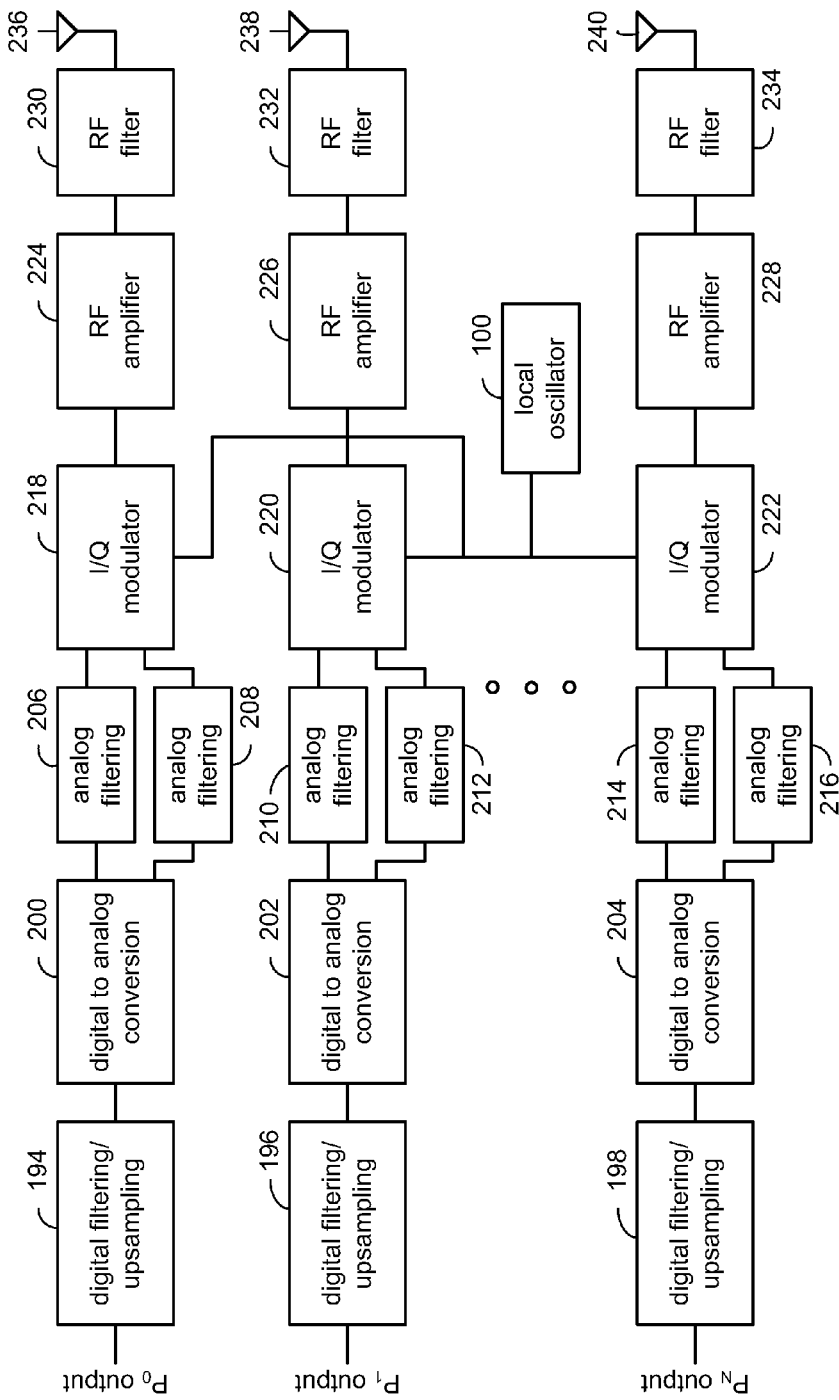

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 178, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleave 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 178 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} c_1 & c_2 & c_3 & c_4 & \ldots & c_{2M-1} & c_{2M} \\ -c_2^* & c_1^* & -c_4^* & c_3^* & \ldots & -c_{2M}^* & c_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-convert the I/Q signals into radio frequency signals.

The RF amplifiers 224-228 amplify the RF signals which are then subsequently filtered via RF filters 230-234 before being transmitted via antennae 236-240.

Figure 11A:
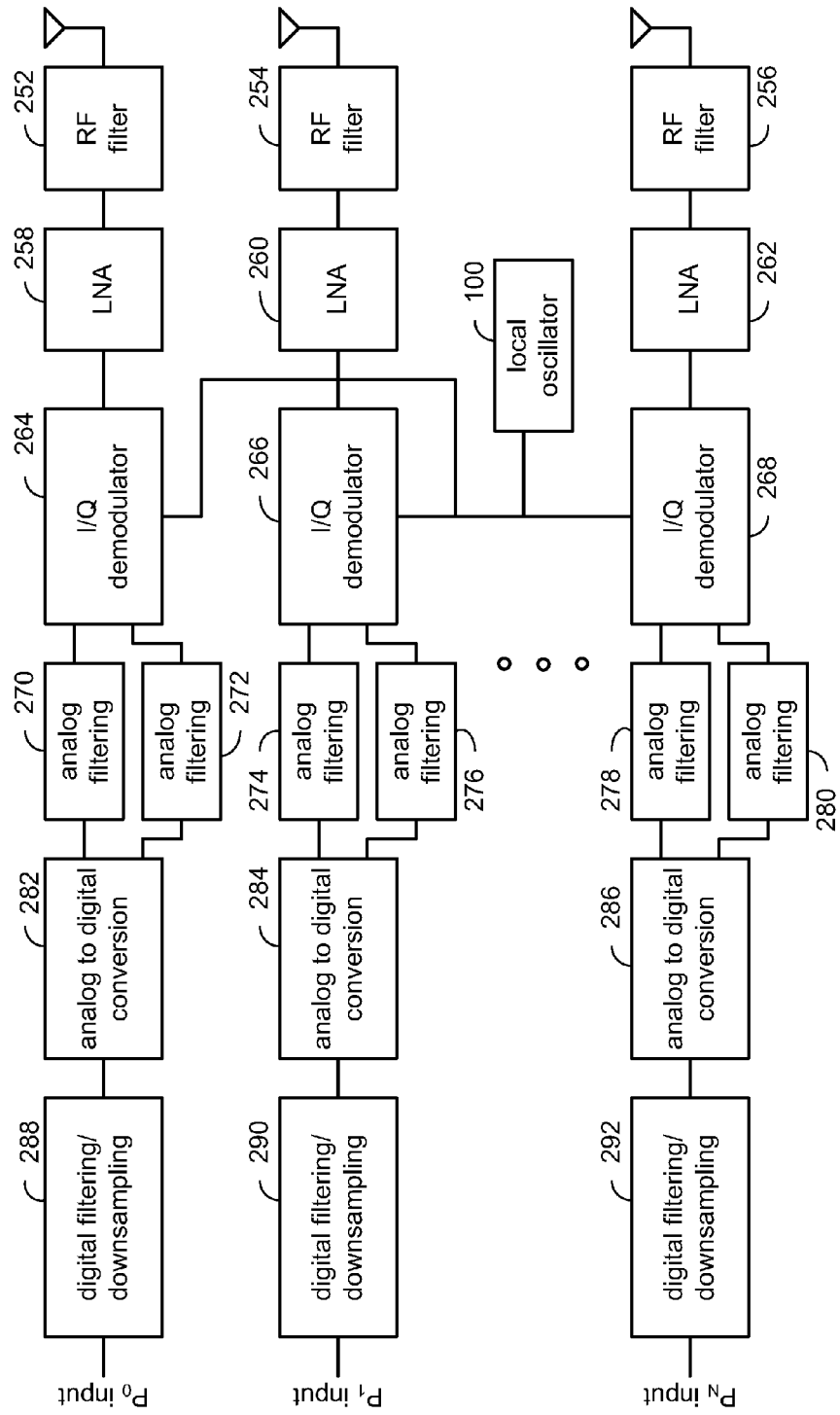
FIGS. 11A and 11B are diagrams illustrating embodiments of a radio receiver.
Figure 11B:
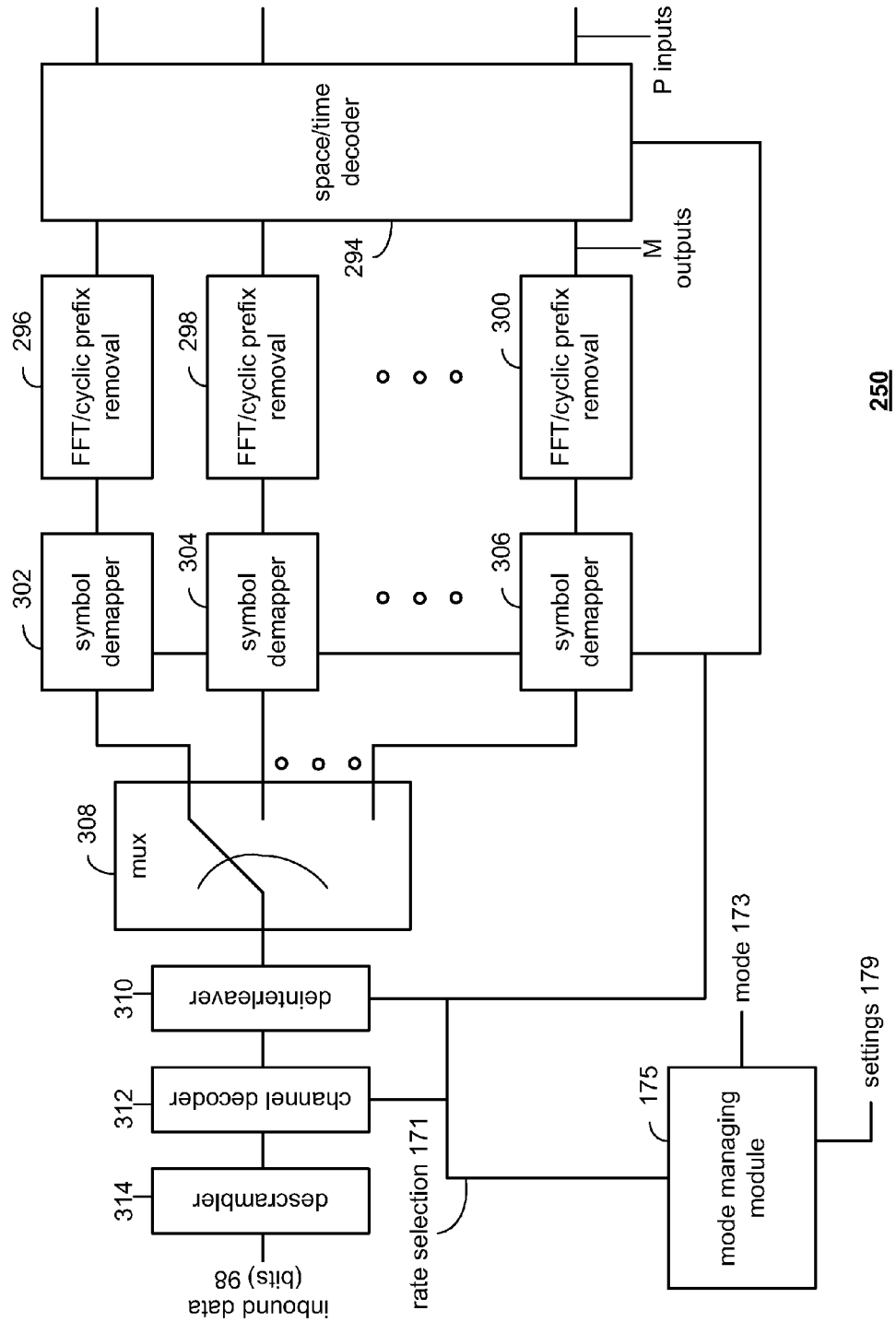

FIGS. 11A and 11B are diagrams illustrating embodiments of a radio receiver. These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-260, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
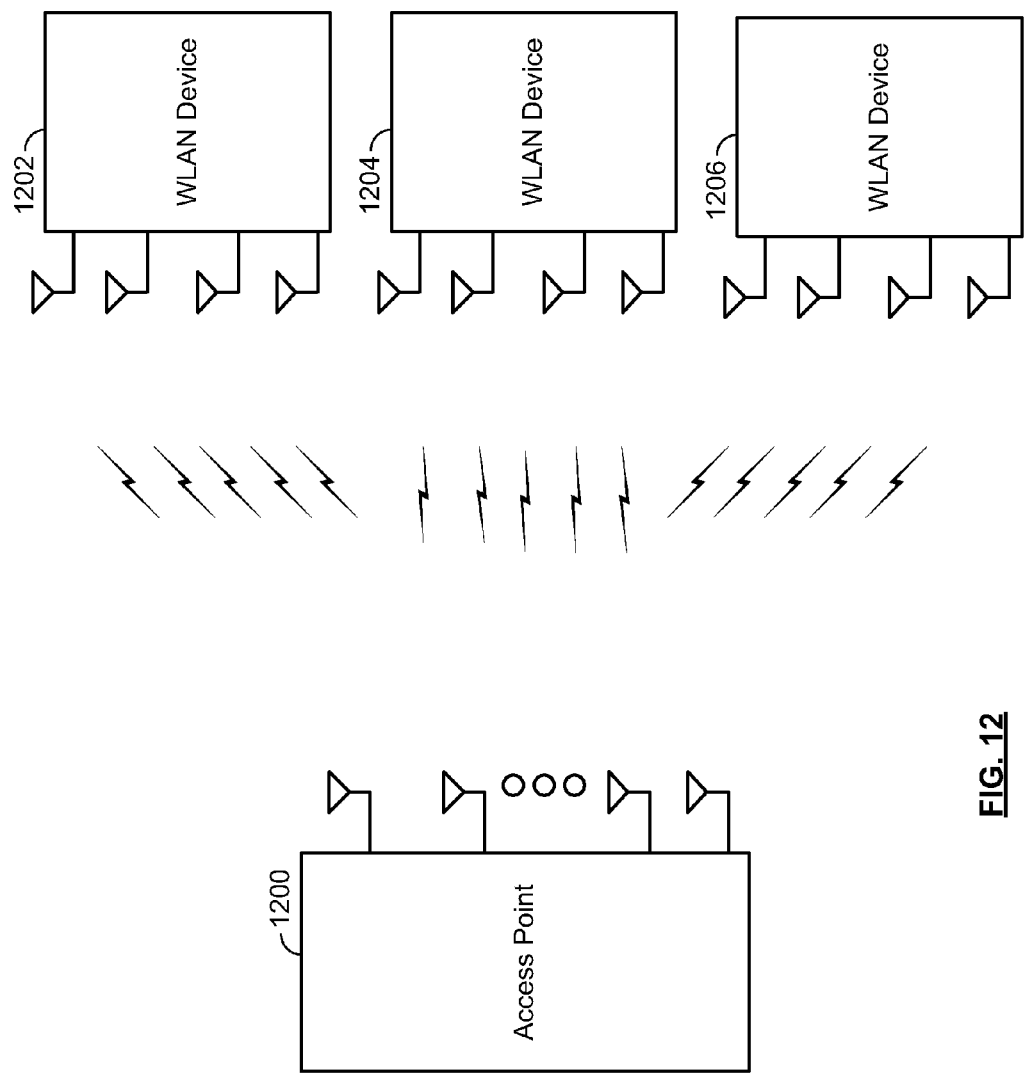
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Figure 13:
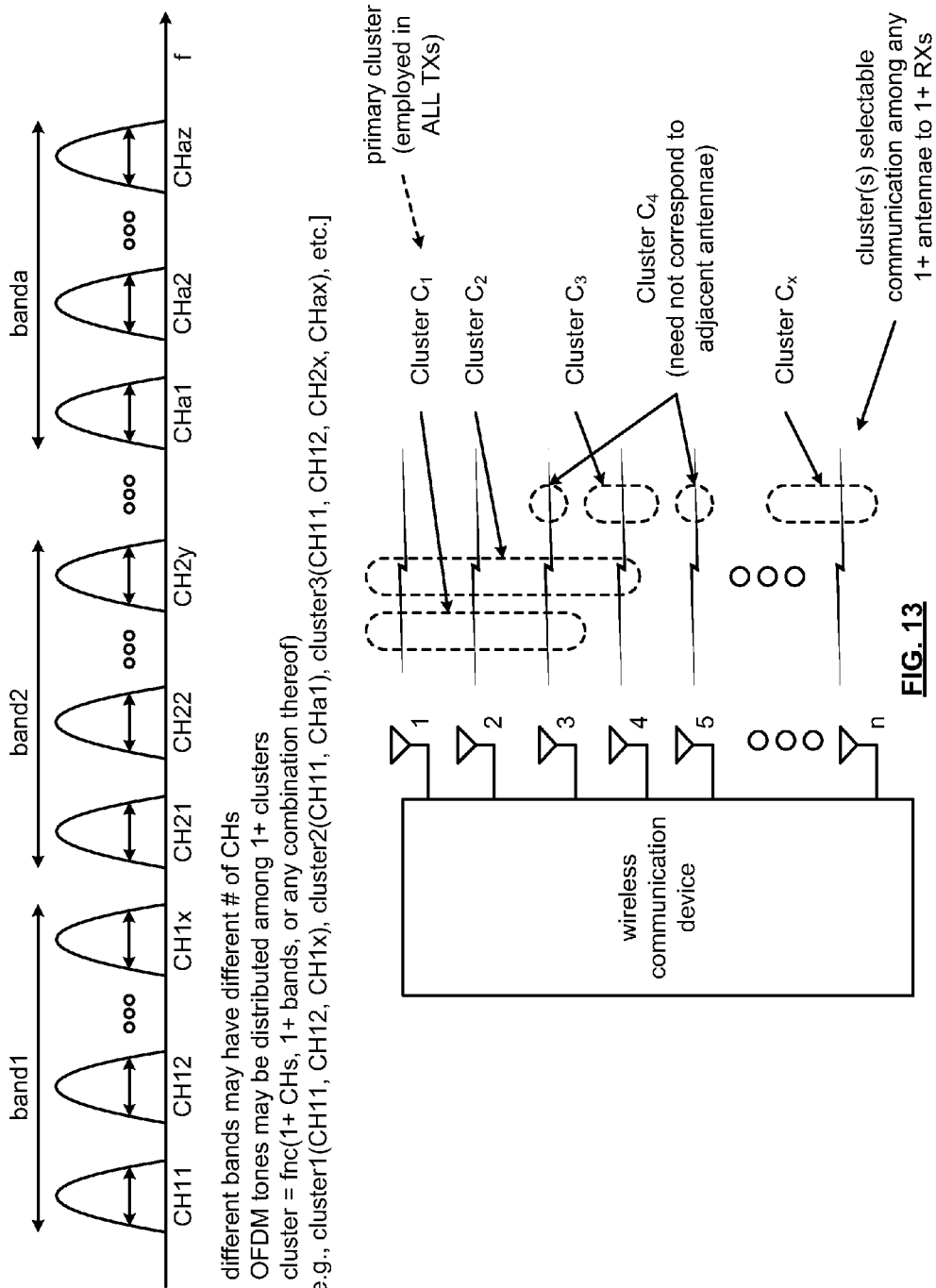
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands. As may be seen in the diagram, any respective cluster may be associated with any one or more antennae (including as few as one antenna as well as up to all of the antennae) of the wireless communication device.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Within the various diagrams and embodiments described and depicted herein, wireless communication devices may generally be referred to as WDEVs. It is noted that such wireless communication devices may be wireless stations (STAs), access points (APs), or any other type of wireless communication device without departing from the scope and spirit of the invention.

In some instances, certain wireless communication devices may be generally viewed as being transmitting wireless communication devices such as APs, and other wireless communication devices may be generally viewed as being receiving wireless communication devices such as STAs. However, it is noted that any functionality, capabilities, etc. described herein may be generally be applied to any types of wireless communication devices.

Of course, it is noted that, with respect to certain embodiments, general nomenclature may be employed herein wherein a transmitting wireless communication device (e.g., such as being an AP, or a STA operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system. Generally speaking, such capability, functionality, operations, etc. as described herein may be applied to any wireless communication device.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ah, ad, af, etc.).

Figure 14:
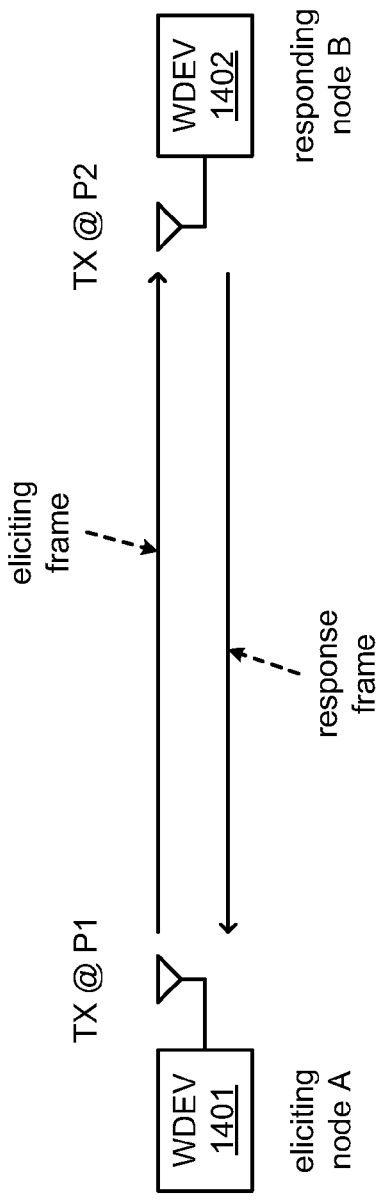
FIG. 14 illustrates an embodiment of response modulation coding set (MCS) selection for communications between communication devices.

FIG. 14 illustrates an embodiment of response modulation coding set (MCS) selection for communications between communication devices. Within this diagram as well as within others, certain communication devices are depicted as (wireless communication devices or WDEVs). However, the reader will understand that general reference to a device, a node, etc. they be equivalently understood as being analogous to a wireless communication device.

As can be seen with respect to this diagram, at least two different devices, depicted by reference numerals 1401 and 1402, are implemented to effectuate communications there between. In certain situations, after a first communication is provided from one device to another, a response communication is provided back to the device that originally provided the first communication. In accordance with this diagram an embodiment, and also with respect to any other diagram and/or embodiments herein, it is noted that any such exchange of communications in which there is some type of response communication may include one or more of the in accordance with various aspects, and their equivalents, of the invention.

For example, various communications and/or exchanges in which there is a response frame may include a clear to send (CTS) provided in response to a request to send (RTS). Various other communications may include a block acknowledgment (B-ACK) in response to data, MAC (media access control) data protocol unit (MPDU), aggregated MAC (media access control) data protocol unit (A-MPDU), or a block acknowledgment request. In even other situations, an acknowledgment (ACK) may be provided in response to management communication, data communication, etc.

Generally speaking, an initial frame in an exchange may be referred to as an eliciting frame. A device that transmits an eliciting frame may generally be referred to as an eliciting node, such as eliciting node A. A device that transmits a response frame may generally be referred to as a responding node, such as responding node B.

In accordance with certain applications, there may be a relatively large difference between the transmit power levels of different devices. When there is such a large difference between the transmit power levels of different devices along a communication link, consideration must be made respect to control response rate and MCS selection. For example, certain control response rate and MCS selection rules may have problems in such situations (e.g., asymmetric transmitter power employed by different devices at opposite ends of a communication link). When the rate employed in the forward direction (e.g., eliciting frame from an eliciting node A) is near or below the highest basic rate value within a basic services set (BSS), the rate employed by a response frame (e.g., a response frame from a responding node B) may be too high for the communication link. Such situations, an acknowledgment (ACK) or block acknowledgment (B-ACK) from the responding node B may unfortunately get lost. Various embodiments of reduction of any one or more operational parameters that govern a response frame communication are presented herein. For example, as is also disclosed elsewhere herein such as with respect to FIG. 17, any one or more operational parameters that govern communications between two devices at opposite ends of a communication link may be covered in accordance with such reduction principles.

For example, in certain situations there may be more than the 10 dB difference between the transmit power levels of two different respective devices, such as where one device uses one or more relatively high power, power amplifiers (PAs), and another device may be implemented and operable to transmit only a relatively much lower powers. For example, in the context of a wireless communication system, such as a WLAN, a base station maybe operative to transmit at signal levels approaching 1 W whereas a given wireless station may be operative to transmit at signal levels around approximately 100 mW. Relatively large differences between the respective transmit power levels may be used herein to trigger certain operations.

Considering yet another example, an access point (AP) may have a higher transmit power than one or more associated wireless stations (STAs) (e.g., that is not operating as an AP). Considering an instance in which the AP is operable to effectuate transmissions at a power of approximately 30 dBm and in which one or more STAs is operable to effectuate transmissions of the power of approximately 15 dBm, such a transmit power asymmetry can allow for downstream transmissions from the AP to the one or more STAs using operational parameters that are relatively higher than may be employed for upstream transmissions from the one or more STAs to the AP. For example, considering modulation coding set (MCS) as one operational parameter (or a group of operational parameters, since MCS inherently corresponds to at least modulation, coding rate, number of streams, etc.), a relatively higher MCS may be employed for downstream transmissions from the AP to the one or more STAs than may be employed for upstream transmissions from anyone of the STAs to the AP.

In accordance with communications between two respective devices, such that at least one of them is a response communication, the selection of the modulation coding set (MCS) to be employed for that response may be made in a variety of ways.

In one embodiment, control of a transmission rate or MCS of a response frame is selected based on the eliciting frames transmission rate or MCS. For example, the response MCS selection may be made with an implicit assumption that the respective communication link margins are approximately the same in both directions and the transmit power levels employed by the respective devices at each end of the communication link are approximately the same.

In certain instances, a response frame is transmitted at the highest MCS from a basic MCS set that has the same or a lower modulation than the eliciting frame. That is to say, a basic MCS set may be known beforehand and by all of the devices within the system. Depending upon the characteristics of the eliciting frame, including the MCS thereof, that response frame may be transmitted using a highest MCS selected from the basic MCS set that is selected from the basic MCS set. For example, the transmission rate of the response frame is set to be a highest rate from the basic rate set of the basic services set (BSS) (e.g., alternatively referred to as BSSBasicRateSet) that is less than or equal to the rate of the eliciting frame. The MCS of the response frame may be set to the highest modulation, coding, and MCS index for which each value of M (for modulation), C (for coding), and I (for MCS index) is less than or equal to the corresponding values of the eliciting frame, starting with the basic MCS set of the basic services set (BSS) (e.g., alternatively referred to as BSSBasicMCSSet). For example, considering embodiment in which an eliciting frame includes values capital M1, C1, and I1, then the corresponding values of the response frame may be set to the highest values within the basic MCS set that are less than or equal to M1, C1, and I1 (e.g., the corresponding values of the response frame may be set to M2≤M1, C2≤C1, and I2≤I1 such that M2, C2, and I2 are all included within the basic MCS set).

It is noted that communications from the eliciting node (e.g., eliciting frame) need not necessarily be made using an MCS that is included within the basic MCS set. As can be seen with respect to such implementation, a response frame MCS is selected based on the MCS of the eliciting frame.

For example, consider a relatively low complexity situation which the basic MCS set includes three MCSs (e.g., such as assuming a high MCS, and middle MCS, and a low MCS). If the eliciting frame is sent using the middle MCS, then the response frame may be sent using that same middle MCS. Also, if the eliciting frame is sent using an MCS that lies in between the high MCS and the middle MCS, then the response frame may also be sent using the middle MCS.

If desired, MCS adaptation may be performed on transmission control protocol (TCP) responses and/or acknowledgments, but there is not necessarily MCS adaptation performed on the media access control (MAC) responses and/or acknowledgments so the MAC layer breaks earlier.

While certain embodiments described herein operate in accordance with a reduction principles in which one or more operational parameters employed for a response frame are controlled as being less than those corresponding one or more operational parameters employed for an eliciting frame, such as being sufficiently differentiated there from (e.g., in accordance with a minimum distance, $d_{min}$), there may be some instances in which there is a sufficiently large margin between the respective one or more operational parameters employed for an eliciting frame and a response from such that such reduction principles need not be employed. For example, even in certain embodiments that do not specifically employ such reduction principles, if the one or more operational parameters employed for an eliciting frame are sufficiently greater than or higher than the corresponding one or more operational parameters employed for a response frame (e.g., such as considered in accordance with BSSBasicRateSet and/ or BSSBasicMCSSet), then there may be sufficient margin to avoid any degradation in performance.

At least two different examples are provided below for illustration to the reader of situations in which selection of one or more operational parameters associated with the response frame may be acceptable/provide adequate performance and may be unacceptable/provide poor/inadequate performance.

The following illustrates an example in which sufficient margins may exist between one or more operational parameters employed for an eliciting frame and those which are employed for a response frame.

EXAMPLE 1

AP TX Power=30 dBm
AP DATA transmissions
Link supports 40 MHz MCS 31=64 QAM R=⅚, 540 Mbps
non-AP STA TX Power=15 dBm
BSSBasicRate$_{highest}$=16 QAM R=½, 24 Mbps
Control response BA transmitted as non-HT Duplicate, 16 QAM R=½, 24 Mbps
Forward link supports maximum 64 QAM, R=⅚
At 15 dB less power, 16 QAM, R=½ is appropriate for the reverse link
As can be seen with respect to this example, the one or more operational parameters employed for response frame sent as an uplink communication from a STA (e.g., that is not operating as an AP) to the AP are sufficiently different from those employed for an eliciting frame sent as a downlink communication from the AP to the STA.

EXAMPLE 2

AP TX Power=30 dBm
AP DATA transmissions
Link supports only 40 MHz MCS 27=16 QAM R=½, 216 Mbps
non-AP STA TX Power=15 dBm
BSSBasicRate$_{highest}$=16 QAM R=½, 24 Mbps
Control response BA transmitted as non-HT Duplicate, 16 QAM R=½, 24 Mbps
Forward link supports maximum of 16 QAM, R=½
At 15 dB less power, 16 QAM, R=½ is NOT appropriate for the reverse link
ACK/BA could be lost
As can be seen with respect to this example, the communication link is capable of supporting a highest modulation of 16 QAM, and a code rate of approximately ½. To effectuate a response frame at a transmission power that is one half of that which is employed with respect to an eliciting frame, yet by employing such operational parameters that are right at the limit of what the communication link and support, can be problematic and may result in a situation in which an acknowledgment (ACK) or block acknowledgment (B-ACK) may be lost during an uplink communication from a STA to the AP.

Figure 15:
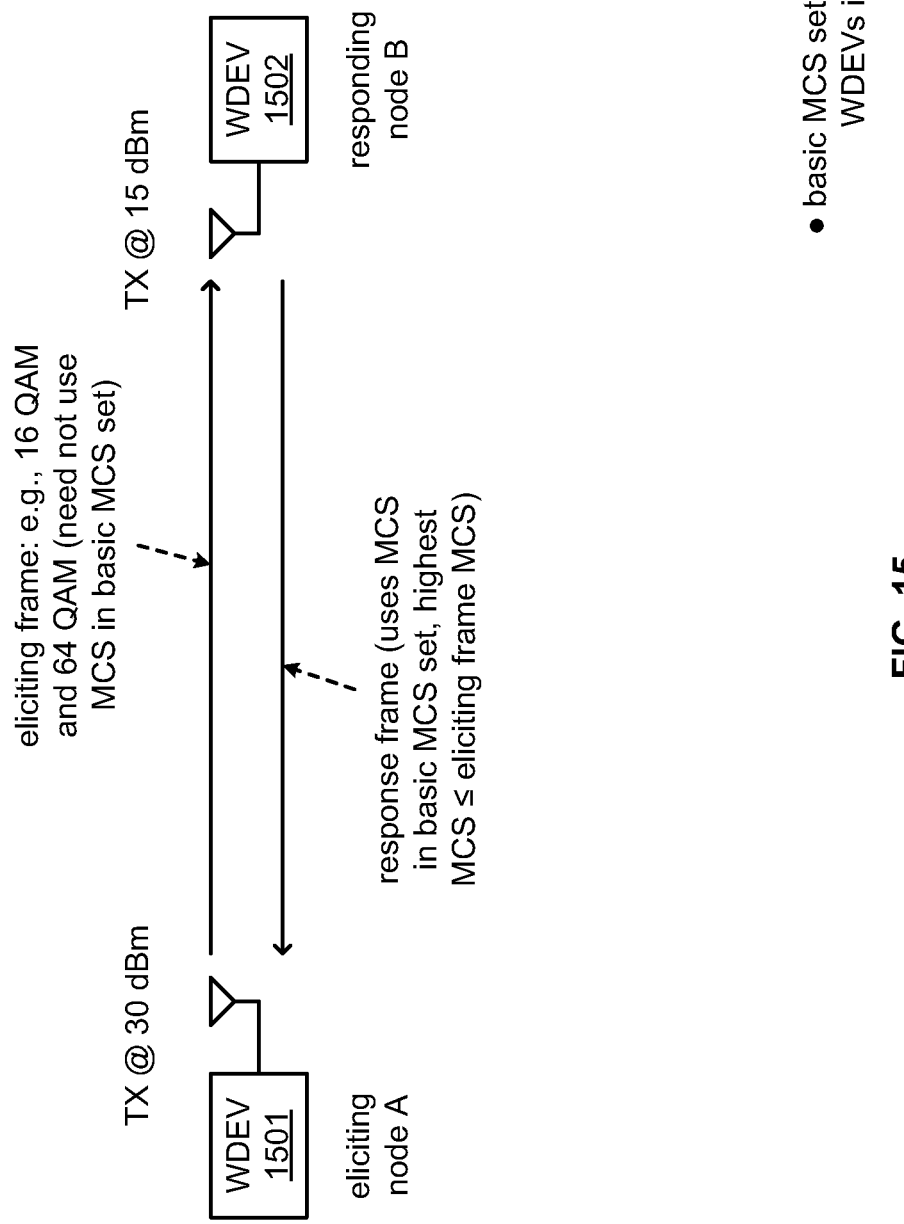
FIG. 15 illustrates an alternative embodiment of response MCS selection for communications between communication devices.

FIG. 15 illustrates an alternative embodiment of response MCS selection for communications between communication devices. As can be seen with respect to this diagram, at least two different devices, depicted by reference numerals 1501 and 1502, are implemented to effectuate communications there between. This diagram illustrates a specific embodiment in which the eliciting node A is operative to effectuate transmissions at 30 dBm, and the responding node B is operative to effectuate transmissions that 15 dBm.

As can be seen when considering the eliciting node A, and its respectively higher transmit power level, a relatively higher order modulation may be employed to transmit eliciting frames. For example, such higher order modulations may include 16 QAM, 64 QAM, etc. Even using these relatively higher order modulations, the responding node B is implemented to receive these eliciting frames successfully.

The responding node B will use the highest MCS in the basic MCS set that has less than or equal modulation to that by which the eliciting frame was sent from the eliciting node A. For example, considering an embodiment in which the eliciting frame was transmitted from the eliciting node A with a given MCS at a particular bit rate, such as 24 Mb per second of Mbps, then the response frame transmitted from the responding node B may be transmitted at that same MCS or one that is relatively lower within the basic MCS set.

In certain situations, the eliciting node A may not be able to receive the response frame successfully because the responding node B transmit power is relatively significantly much lower than the eliciting node A transmit power. That is to say, the combination of disparate transmit powers and MCS may be inadequate for the particular communication link.

Unfortunately, in certain situations, a sharp drop in throughput of the communication link may occur because response frames are lost during transmission. The MCS of the response frame is not going to change unless the MCS of the eliciting frames transmitted by the eliciting node A change to a relatively lower order MCS (e.g., change to a relatively lower order modulation). In accordance with the response frame MCS selection being made based upon the eliciting frame MCS, if the eliciting node A can change to a relatively lower order MCS, then the responding node B should be able to transmit a response frame at and also relatively lower order MCS, and hopefully the response frame will be received by the eliciting node A.

From certain perspectives, it is noted that an MCS drop on the eliciting node A can also result in a drop in throughput of the communication link. However, it is noted that such an undesirable situation (e.g., a decrease in throughput) may be totally unnecessary if the response frame MCS could be decreased using some alternative means.

Figure 16:
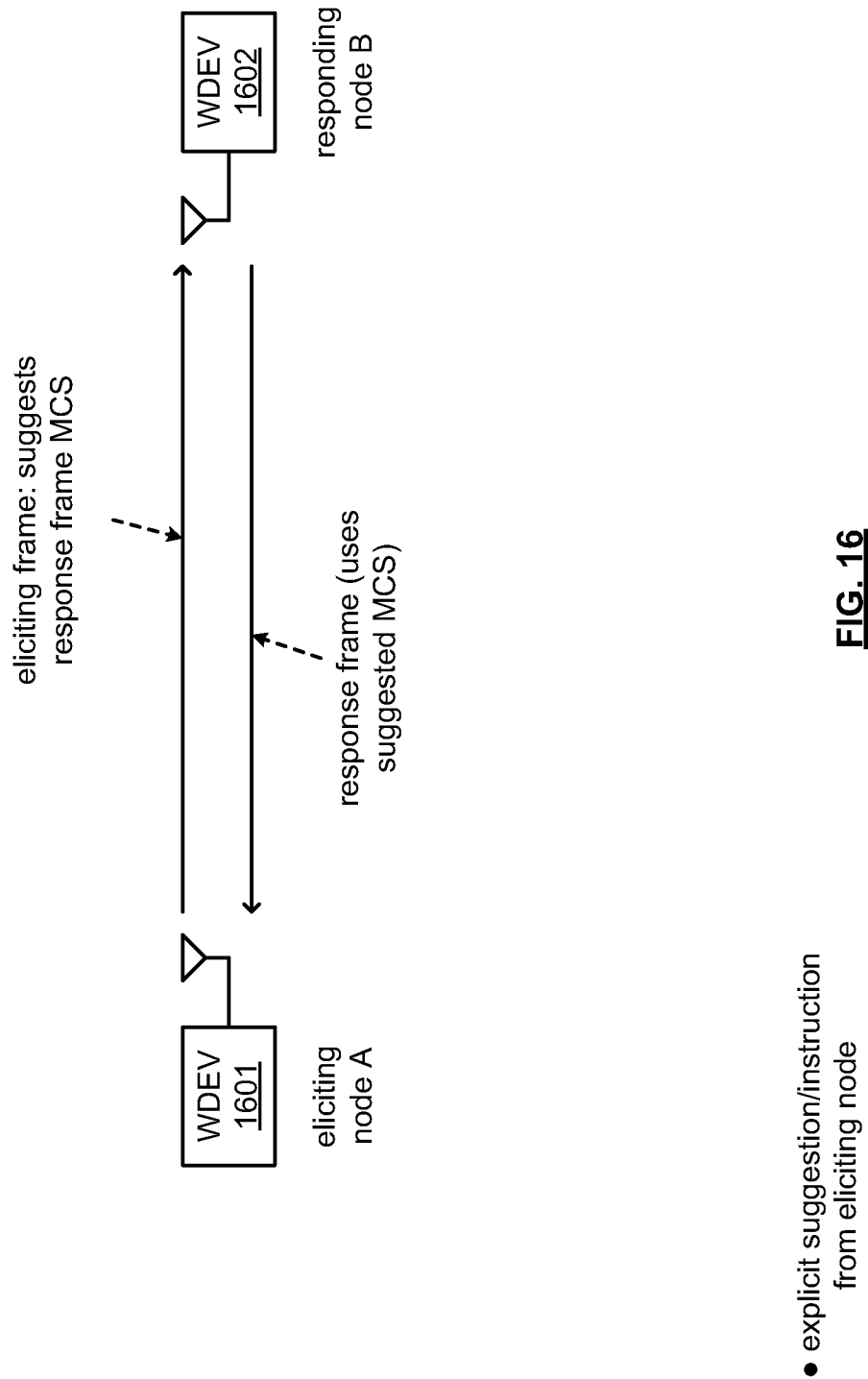
FIG. 16 illustrates an embodiment of explicit suggestion/instruction response MCS selection for communications between communication devices.

FIG. 16 illustrates an embodiment of explicit suggestion/instruction response MCS selection for communications between communication devices. As can be seen with respect to this diagram, at least two different devices, depicted by reference numerals 1601 and 1602, are implemented to effectuate communications there between.

With respect to this diagram, and exchanges provided between the respective devices such that explicit suggestion and/or instruction is provided from the eliciting node A. It is noted that such a suggestion and/or instruction may be provided from the eliciting node A only when it is determined that a particular MCS is needed. For example, the determination of the need for a particular MCS may be made using any one or more of a number of considerations. For example, determination may be made explicitly as a function of the respective transmit power level difference between the respective devices within the system. Explicit information exchange may be provided between respective devices to ascertain the respective transmit power levels of the respective devices, and also to determine the transmit power level difference there between.

Determination may alternatively be made by measured received power during response frame reception at the eliciting node A. For example, when the eliciting OA receives a response frame from another device, it may measure the received power of that received communication. In certain instances, a relatively low received power of that received communication may be used to trigger the need for a particular MCS to be suggested by the eliciting node A.

In even other embodiments, such determination may be made by the measured channel/bit error rate (BER)/packet error rate (PER) statistics for certain frames of admin transmitted by the responding node B and received by the eliciting node A. That is to say, certain characteristics associated with response frames that are received by the eliciting of A, beyond only received power, may be employed to precipitate the selection of a particular MCS.

In addition, certain link measurement report information may be employed for such termination. Also, certain measured parameters may be averaged by the eliciting node A before making a given determination to provide a suggestion and/or instruction to the responding node B regarding a particular MCS by which response frames should be provided there from.

Again, it is noted that any one or more, or any combination of such considerations, including certain weighted combinations, average combinations, etc., may be used to trigger a response frame MCS selection at the eliciting node A. In even other situations, the responding node E may simply request that the eliciting node to suggest and/or instruct a particular response frame MCS to be used by the responding node B.

Figure 17:
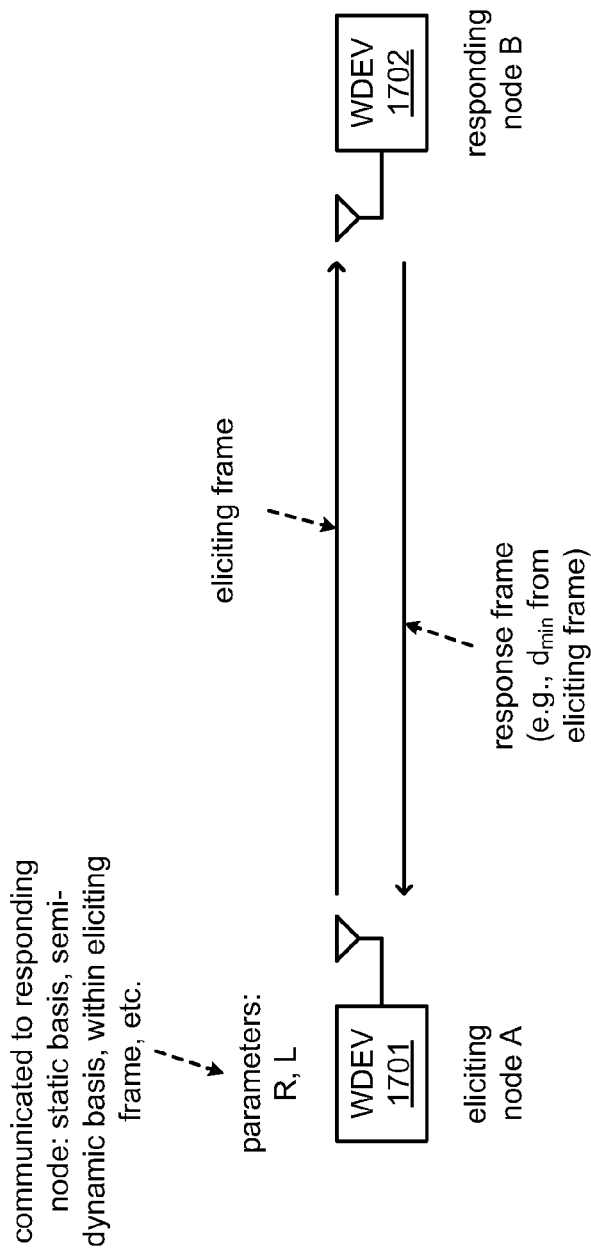
FIG. 17 illustrates an embodiment of response MCS selection for communications between communication devices, and particularly using certain operational parameters therein.

FIG. 17 illustrates an embodiment of response MCS selection for communications between communication devices, and particularly using certain operational parameters therein. As can be seen with respect to this diagram, at least two different devices, depicted by reference numerals 1701 and 1702, are implemented to effectuate communications there between.

In operation in accordance with this mode, at least two different parameters, R (reduction) and L (limit), may be determined by the eliciting node A using any one or more or any combination of the various considerations described above in regards to the eliciting node A providing a suggestion and/or instruction of a particular response frame MCS to be used a responding node B. In some embodiments, such parameters as R and/or L, may be viewed as being respective vectors (e.g., each respectively describing one or more parameters associated with such communications between eliciting node A and responding node B; e.g., a given MCS can inherently can include multiple parameters such as modulation, coding rate, number of streams, etc.). It is also noted that certain embodiments may include only the parameter, R (reduction). For example, all embodiments need not necessarily include the parameter, L (limit), but may instead only employ the parameter, R (reduction). Again, either one or both of the parameter, R (reduction), and the parameter, R (reduction), may be viewed as being vectors, in that, either of these respective parameters may specify or govern operation based on multiple operational parameters.

With respect to the parameter R related to reduction, this relates to the MCS of the response frame transmitted by a responding node B that should be R orders below the MCS used for the eliciting frame transmission. For example, if an eliciting frame is transmitted with a given MCS, the response frame MCS should be at least R orders below the eliciting frame's MCS.

With respect to the parameter L related to limit, this relates to a value of one or more operational parameters below which the parameter R applies. It is noted that in an embodiment in which the parameter L is implemented as a vector, such as corresponding to multiple operational parameters, multiple respective values may be indicated for the one or more operational parameters below which the parameter R applies. Also, there may be embodiments in which the parameter R is implemented as a vector, such as corresponding to multiple operational parameters. As such, generally speaking, the use of the parameter L in the parameter R may be employed in cooperation to govern individually and independently a number of operational parameters. For example, considering an embodiment in which the parameter L includes L1, L2, L3, etc. and the parameter R includes R1, R2, R3, etc., then the parameter L1 corresponds to a value of a first operational parameter below which the parameter R1 applies. The parameter L to corresponds to a value of a second operational parameter below which the parameter R to applies, and the parameter L3 corresponds to a value of a third operational parameter below which the parameter R3 applies, etc. Generally speaking, the use of the parameter L, implemented as a vector, and the parameter R, implemented as a vector, allows for the governing of multiple respective operational parameters in accordance with the reduction and limit principles described herein.

For example, in one embodiment, with respect to the parameter L related to limit, this relates to the modulation/coding of the eliciting frame below which the parameter R applies. That is to say, at or above L, the responding node B does not necessarily apply the parameter R to responding MCS selection. Instead, the responding node B may use some alternative approach by which to select the MCS by which a response frame should be transmitted to the eliciting node A. For example, the responding node B may select the highest MCS within the basic MCS set that is less than or equal to the MCS of the eliciting frame. Of course, alternative means may be employed for the selection of response frame MCS.

Generally speaking, with respect to these respective parameters, R and L, if the rate of response frames, such as acknowledgments, is too high, these respective parameters may be adjusted accordingly. It is noted that such response frames may be lost for a number of different reasons, including collisions, improper MCS selection, etc.

It is noted that while the eliciting node A may be implemented to determine these respective parameters, R and L, the responding node B also has knowledge of these parameters. For example, the eliciting node A may also communicate such parameters to the responding node B. The communication of these parameters may be made as a variety of ways from the eliciting node A to the responding node B. For example, such communication of these parameters may be made on the static basis, such as in accordance with an association exchange. Alternatively, such communication of these parameters may be made on a semi-dynamic basis; such communication may be made using management frames to communicate changes at any given time. In even another embodiment, such communication of these parameters may be made using an eliciting frame itself such as in accordance with a dynamic basis mode of operation. It is noted that not all eliciting frames need necessarily carry any MCS suggestion and/or instruction from the eliciting node A to the responding node B. For example, the responding node B they continue to use the latest/last received instruction and/or suggestion regarding MCS until a new instruction enters suggestion regarding MCS is received from the eliciting node A. Generally speaking, any of the desired number of ways by which both the eliciting node A and the responding node B are apprised of the respective parameters, R and L, may be employed in various embodiments.

In alternative embodiments, these respective parameters, R and L, may be known beforehand by both an eliciting node A and a responding node B. That is to say, such parameters may be predetermined, predefined, etc. and stored within some memory of each of the respective devices. In even other embodiments, default values for these respective parameters maybe known beforehand by the various respective devices within the system.

A number of considerations may be employed for use in the determination of the parameters, R and L. For example, the number of retries of frames that are transmitted from a given node may be used as at least one consideration in determining these parameters. Retries of eliciting frames are received from the node and the retried eliciting frames were successfully received of the responding node B and acknowledged by the responding node B. It is noted that a retry implies that a response frame, such as an acknowledgment, was lost during transmission (e.g., failure to receive an acknowledgment). This may have unfortunately occurred because of an appropriate MCS selection for the respective communication link. In certain embodiments, the responding node B may attempt to differentiate the loss of such a response frame that is due to collision as opposed to the loss of such a response frame due to an inappropriate MCS selection. It is noted that loss of a response frame due to an inappropriate MCS selection may be differentiated when the response frame is lost within a transmit opportunity (TXOP) that has included at least one complete frame exchange. In even other embodiments, the eliciting node A can do certain things to determine and differentiate the loss of a response frame due to different reasons.

Also, there may be certain situations in which a suggested response MCS may not be able to be supported by a given communication link. For example, examination of transmit power reported by an eliciting node A being greater than the transmit power of a responding node B may provide the determination that a suggested response MCS may not be appropriate. Also, examination of the respective transmit powers by the respective nodes, A and B (and determining that the transmit power of A is greater than that of B), and the link margin (if known) combined with the response node transmit power may not necessarily support the suggested response MCS.

For example, when the difference in the respective transmit powers exceeds the difference in the minimum signal-to-noise ratio (SNR) required between the eliciting frame MCS in the response frame MCS, then a reduction in the response frame MCS may potentially be appropriate. The amount of reduction of the MCS may be based upon the difference in respective transmit powers of the respective nodes, A and B, and the estimated link margin. There may be certain situations in which a relatively lower responding node transmit power may still be sufficient/adequate for a given communication link with excellent margin, such as if both of the respective devices are receiving packets with a reasonably good probability (e.g., an acceptable signal to noise ratio (SNR)/packet error rate (PER) and/or acceptable bit error rate (BER)/packet error rate (PER)).

Consideration is also presented herein regarding when to apply adjustment of one or more operational parameters employed for a response frame. Collection and exchange of relevant information may be performed at or during association of two or more devices. Alternatively, the exchange of one or more management frames between the devices may be made outside of association. For example, as described later with respect to FIG. 24, transmit power related information may be exchanged between different respective devices in a variety of ways.

Information related to the upset direction link may be provided in the form of a relatively margin reduction as compared to the known communication link. For example, when one or more operational parameters by which a given communication link may operate are known, a relative link margin reduction may be provided in comparison to those one or more operational parameters associated with the given communication link. In some embodiments, a responding node B will know forward link information, yet will need information corresponding to the reverse link. Analogously, in some instances, and eliciting node A will know reverse link information, yet will need information corresponding to the forward link. Such information may be shared between different respective devices located at different ends of a communication link in a variety of ways including through one or more management frame exchanges. For example, a link measurement report may be communicated from one device located at one end of the communication link to another device located at the other the communication link. In even other embodiments, information related to the opposite direction link may be determined independently by a given device (e.g., without necessarily requiring communication or information provided from another device located at the other end of the communication link).

Figure 18:
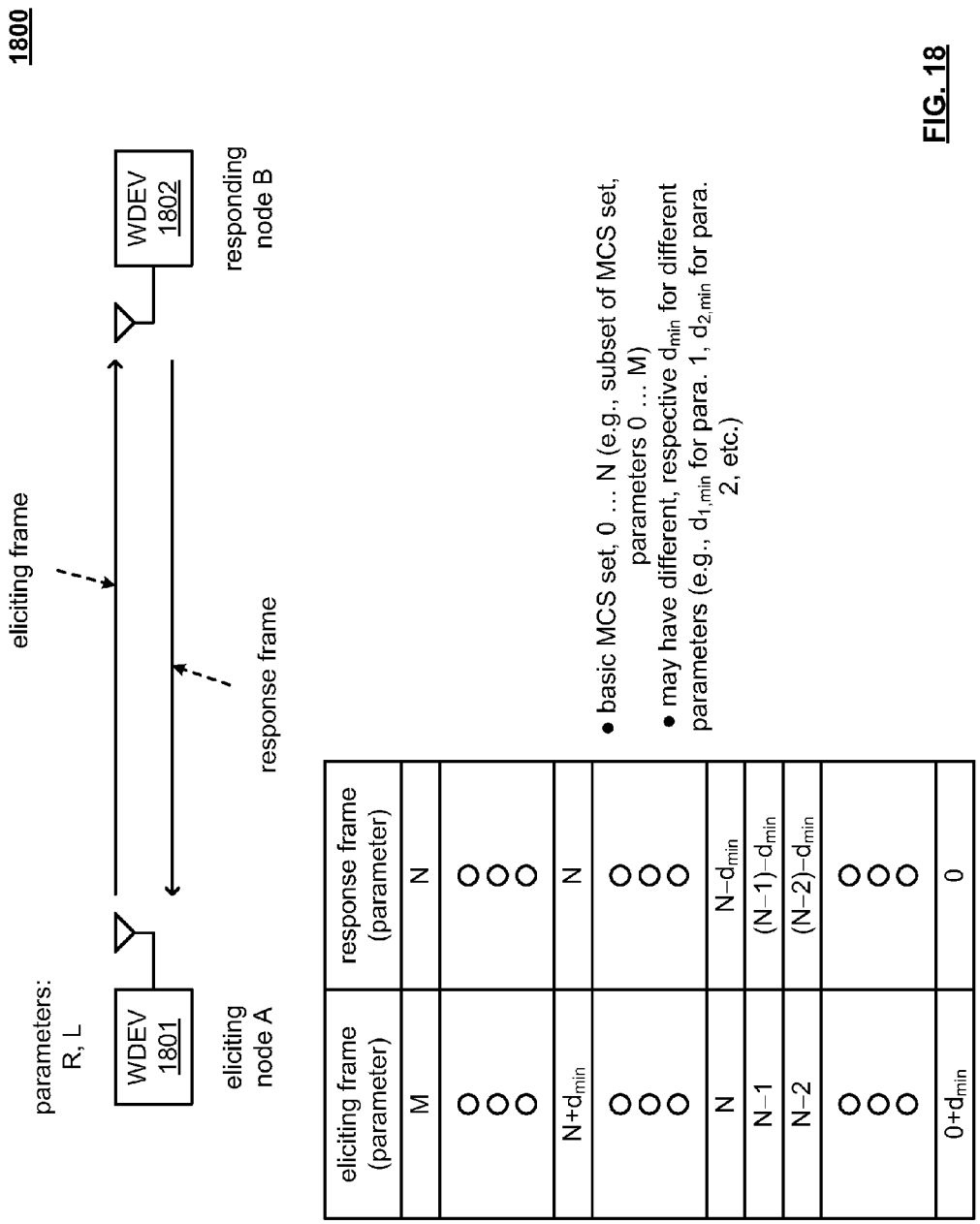
FIG. 18 illustrates an alternative embodiment of response MCS selection for communications between communication devices, and particularly using certain operational parameters therein.

FIG. 18 illustrates an alternative embodiment 1800 of response MCS selection for communications between communication devices, and particularly using certain operational parameters therein. As can be seen with respect to this diagram, at least two different devices, depicted by reference numerals 1801 and 1802, are implemented to effectuate communications there between.

It is noted that different embodiments may operate in accordance with different decision-making operational modes. For example, certain embodiments will operate in accordance with an elicitor-based decision-making operational mode, while other embodiments will operate in accordance with a responder-based decision-making operational mode.

For example, with respect to an elicitor-based decision-making operational mode, an eliciting device (e.g., such as a wireless station (STA)) may be implemented to determine that reduction of one or more operational parameters should be made with respect to a response frame. For example, considering one such operational parameter as transmission rate, it may be determined that reduction of the response rate is needed. In accordance with one possible embodiment of such an operational mode, information related to the amount of reduction needed may be provided in a management frame exchange. In accordance with another possible embodiment of such an operational mode, information related to the amount of reduction needed may be provided within an eliciting frame. For example, at least one field within an eliciting frame may indicate reduction by a given amount. This may be indicated by indicating to reduce a certain number of steps (e.g., N steps), where a step corresponds to a change in at least one operational parameter. It is of course noted that different operational parameters may be managed in accordance with different steps (e.g., a step 1 employed for modulation, a step 2 employed for coding rate, etc.). Generally speaking, a great deal of granularity may be provided such that each different respective operational parameter may be independently and individually governed, controlled, reduced, adjusted, etc.

As also described elsewhere herein, such as with respect to the parameter L related to the operational parameter below which the parameter R applies, there may be some indication, which may be implemented on an operational parameter by operational parameter basis, at and below which such reduction functionality takes place. For example, considering the operational parameter of modulation, if the MCS preliminarily identified for use in the response frame response is less than some predetermined value (e.g., such as defined in accordance with the parameter L), then reduction of the MCS employed for the response may be made in accordance with a given step (e.g., reduce the originally identified MCS to be employed for the response frame by the step N).

Also, in accordance with such an elicitor-based decision-making operational mode, and eliciting device (e.g., such as a wireless station (STA) located at the eliciting node A) may be operative to adjust the media access control (MAC) duration (DUR) fields and eliciting transmissions appropriately.

Considering another example, with respect to a responder-based decision-making operational mode, a device (e.g., such as a wireless station (STA) implemented at a responding node B) may be implemented to determine that reduction of one or more operational parameters is needed. Such determination may be made by such a responding device through examination of transmit power as reported from another device (e.g., from an access point (AP) or an eliciting wireless station (STA) implemented at an eliciting no A). Alternatively, such determination may be made through repeated duplicate receptions, which may be indicated of a number of retries, failure to receive acknowledgments, etc. In accordance with this responder-based decision-making operational mode, a responding node B may be implemented to determine the amount of reduction to apply. In certain embodiments, it may be desirable if a responding node B announces its intention or plan to perform such reduction to and eliciting node A so that the eliciting node A can adjust the respective MAC DUR values appropriately in its respective the eliciting transmissions; such information may be communicated between respective devices through one or more management from exchanges.

Referring particularly to the diagram, considering an entire MCS set as including a number of values varying between 0 and M (e.g., such that the values correspond to one particular operational parameter, such as modulation, coding rate, number of streams, etc.), and considering a basic MCS set as including a number of values vary between 0 and N. As may be seen, the basic MCS set may be viewed as being a subset of the entire MCS set. An eliciting node A may support communications in accordance with any of the respective MCS values within the entire MCS set, but the responding node B may support communications in accordance with those values within the basic MCS set. As also described elsewhere herein, an eliciting node A need not necessarily employed those particular values within the basic MCS set for supporting communications there from. In accordance with the reduction principles presented herein, if an eliciting node A transmits an eliciting frame to the responding node B using any value within the entire MCS set between M and N+$d_{min}$, inclusive, then the highest value may be employed by the responding node B in transmitting a response frame to the eliciting node A would be N (e.g., the highest respective value within the basic MCS set that is the minimum distance, $d_{min}$, below the corresponding value employed for the eliciting frame). Again, while this diagram illustrates a number of values corresponding to a singular operational parameter for ease of illustration, it is noted that there may be multiple respective sets of values corresponding to different respective operational parameters. The reader will properly understand that and eliciting frame may include a number of different respective parameters, such as M1, M2, M3, etc., yet illustration is provided with respect to this diagram showing the relationship to a single operational parameter for ease of illustration.

With respect to the parameter of minimum distance, $d_{min}$, it is noted that the corresponding value employed for a given operational parameter within a response frame will be minimally separated from the value employed for that corresponding operational parameter within an eliciting frame. That is to say, in this example, the value employed for a given operational parameter within a response frame will always be separated by that minimum distance from the value employed for that corresponding operational parameter within an eliciting frame.

Considering a specific example in which the value of a given operational parameter relate specifically to MCS, and considering the eliciting frame which may be provided at any MCS between 0 and 27, inclusive, a minimum distance of $d_{min}=2$, and a basic MCS set including a maximum MCS of 16 (e.g., basic MCS set including any MCS between zero and 16, inclusive), then a response frames MCS could be provided in an MCS of 16 so long as the eliciting frame's MCS is 18 or greater. This to say, so long as the eliciting frame is provided using an MCS that is 18 or greater, then the response frame may be provided using the maximum MCS within the basic MCS set, namely, 16. However, if the eliciting frame is provided using an MCS of 16, then the response frame could not be provided using the maximum MCS within the basic MCS set since the minimum distance requirement would need to be met; in such an instance, the response frame may be provided using an MCS of 14. Generally speaking, the response frame may be provided using a maximum MCS within the basic MCS set that is still compliant in accordance with the minimum distance requirement.

Figure 19:
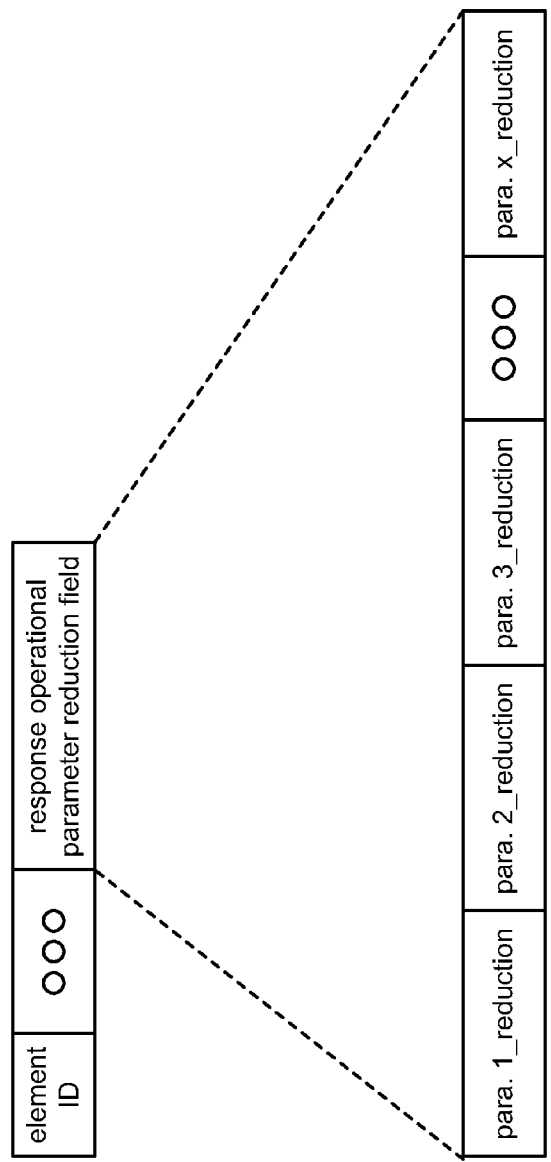
FIG. 19 illustrates an embodiment of a communication including a response reduction field therein for communications between communication devices.

FIG. 19 illustrates an embodiment 1900 of a communication including a response reduction field therein for communications between communication devices. Various communications may be made between different respective devices at opposite ends of the communication link for independent in individual control and adjustment of different respective operational parameters. Certain embodiments may make such communications between such devices on a per MAC (media access control) data protocol unit (MPDU) signaling basis. For example, it may be desirable in certain embodiments to include within an eliciting frame one or more operational parameters to be employed in a subsequent response frame. That is to say, the eliciting frame may be implemented to include one or more operational parameters that signal the manner by which a response frame is to be provided. It is noted that certain implementations and their associated frame formats may not have sufficient bit locations available for indicating such information therein. However, various other implementations and their associated frame formats, such as new frame formats, may be designed to provide for such information to be included within and eliciting frame.

One possible embodiment 1900 as depicted within this diagram shows a response operational parameter reduction field included within a communication. The response operational parameter reduction field may include different respective reduction values associated with different respective operational parameters. For example, any of a number of different parameters may be respectively controlled in accordance with separate and distinct reduction values. The reduction values are the respective minimum reduction to be employed between those operational parameters employed within an eliciting frame and a responding frame. For example, a first plurality of operational parameters, P1, P2, P3, etc. may be employed for an eliciting frame. The reduction values will respectively indicate the minimum reduction to be made to each of these respective operational parameters P1, P2, P3, etc. (e.g., thereby generating P1', P2', P3', etc.) that may be employed for a response frame. As can be seen, each individual operational parameter may be individually governed with respect to a different reduction value.

Such a communication including an operational parameter reduction field may be made from an eliciting node A to a responding node B. For example, there may be embodiments in which the eliciting node A makes the decisions regarding the respective reduction values associated with these one or more operational parameters. In other embodiments, the eliciting node A and the responding node B may operate cooperatively to determine these respective reduction values, and even other embodiments, the responding node B makes the decisions regarding the respective reduction values associated with these one or more operational parameters.

Figure 20:
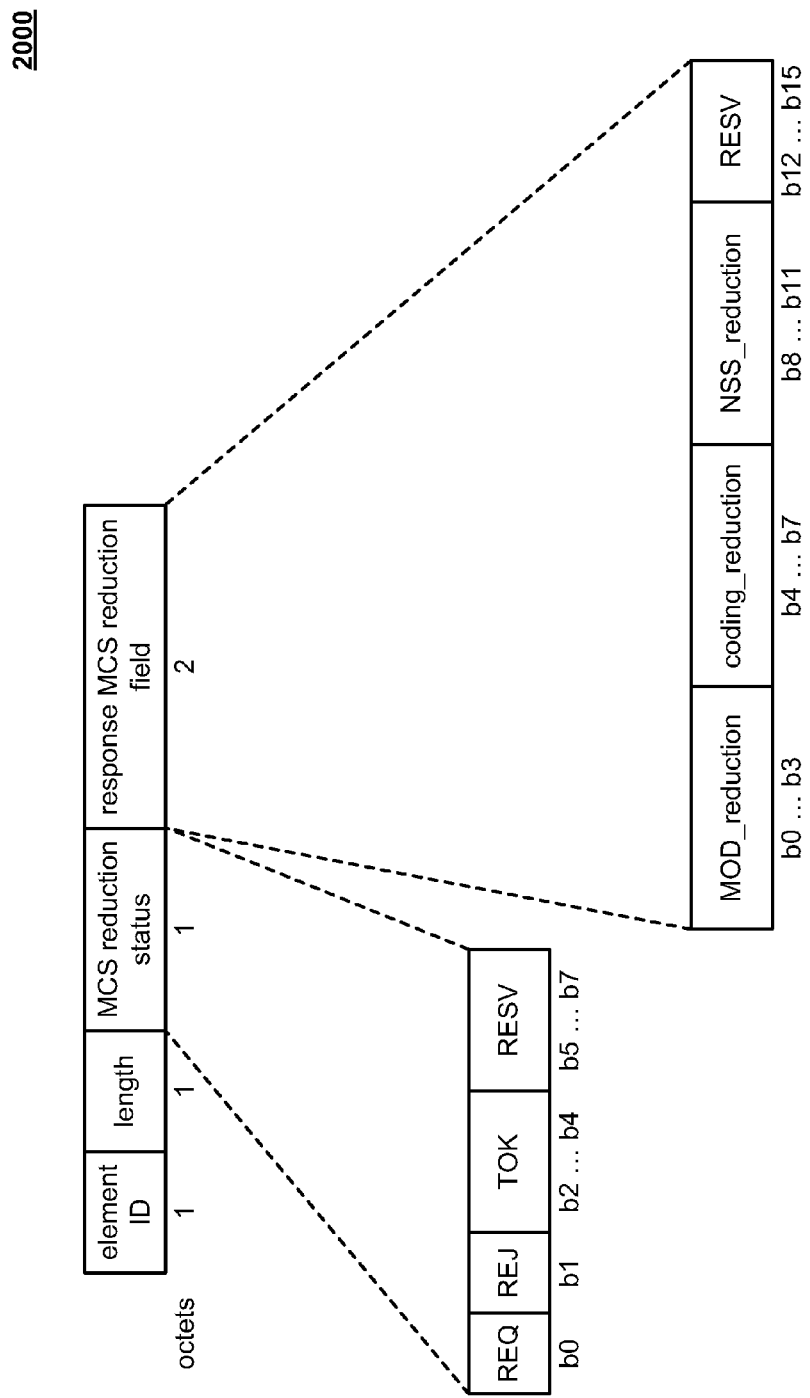
FIG. 20 illustrates another embodiment of a communication including a response reduction field therein for communications between communication devices.

FIG. 20 illustrates another embodiment 2000 of a communication including a response reduction field therein for communications between communication devices. This diagram illustrates a specific format of a communication including a response operational parameter reduction field, specifically directed towards MCS. That is to say, the response operational parameter reduction field of this diagram relates particularly to a response MCS reduction field. Of course, as can be seen with respect to the previous embodiment, a response operational parameter reduction field may include any number of operational parameters. The response MCS reduction field of this diagram is one particular embodiment.

With respect to this diagram, and MCS reduction status field may be used for request, response negotiation between different respective devices. The response MCS reduction field includes a number of different respective reduction values that are the minimum reduction to be employed between those corresponding parameters employed within an eliciting frame and a response frame. Specifically within this diagram, the response MCS reduction field includes at least three separate subfields that correspond respectively to the minimum reduction associated with modulation, the minimum reduction associated with coding rate, and the minimum reduction associated with the number of streams (e.g., such as the number of space-time streams, NSS).

Considering the specific operational parameter of modulation, the difference between QPSK and BPSK modulation may be viewed as one step with respect to that operational parameter (e.g., 1 step is the change of modulation from QPSK to BPSK. Considering the specific operational parameter of coding rate, the difference between ⅚ and ¾ may be viewed as one step with respect to that operational parameter. Considering the specific operational parameter of number of streams, the difference between NSS=4 and NSS=3 may be viewed as one step with respect to that operational parameter.

It is noted that if reduction of a given operational parameter yields a non-existent MCS, then reduction may be performed in such a way as to yield an actually existent/real MCS. For example, if reduction operates to produce a modulation type of QPSK with a code rate of ⅚, then reduction is performed to find an actually existent/real MCS, such as QPSK with a code rate of ¾.

It is also noted that certain management frame exchange may be performed between different respective devices. For example, a new management action may be employed in accordance with the category of high throughput (HT). This may be employed to provide control response MCS reduction. This may also be implemented to include a response operational parameter reduction element (such as that which is described with reference to FIG. 19) and/or a response MCS reduction element (e.g., such as that which is described with reference to FIG. 20).

With respect to a request or eliciting frame in accordance with such a management exchange, the request (REQ) field may be set to a value of 1. Such a communication may be sent from a device such as a wireless station (STA) (e.g., that is not operating as an access point (AP)) to another device such as an associated AP or another STA (e.g., that is also not operating as an AP). The sending device, such as the STA, will not employ reduction in the request frame unless accepted by the recipient of the request frame.

With respect to a response frame in accordance with such a management exchange, the REQ field may be set to a value of 0. Such a communication may be sent from a device such as an access point AP to another device such as a STA. Alternatively, such a communication may be sent from a device such as a STA (e.g., that is not operating as an AP) to a requesting device such as another STA (e.g., that is also not operating as an AP). A given device such as an AP may send an unsolicited response to other devices within the system, and such an unsolicited response should be obeyed.

Some examples are provided below for illustration to the reader regarding operation that may be performed in accordance with reduction and operation that may be performed without reduction

EXAMPLE WITH NO REDUCTION

Reduction=MOD 1, Coding 1, NSS 0
BSSBasicMCSSet includes MCS0—MCS15
STA1 TX AMPDU MCS23 (64Q, ⅚, 4)
STA2 determines BA response to be MCS15 (64Q, ⅚, 2)
STA2 determines that all minimums are met, so no reduction is required

EXAMPLE 1 WITH REDUCTION

Reduction=MOD 1, Coding 1, NSS 0
BSSBasicMCSSet includes MCS0—MCS15
STA1 TX AMPDU MCS18 (QPSK, ¾, 3)
STA2 determines BA response to be MCS10 (QPSK, ¾, 2) before reduction
STA2 determines that some minimums are not met, so reduction is required
Reduction gives BPSK, ½, 2=>MCS8

EXAMPLE 2 WITH REDUCTION

Figure 21:
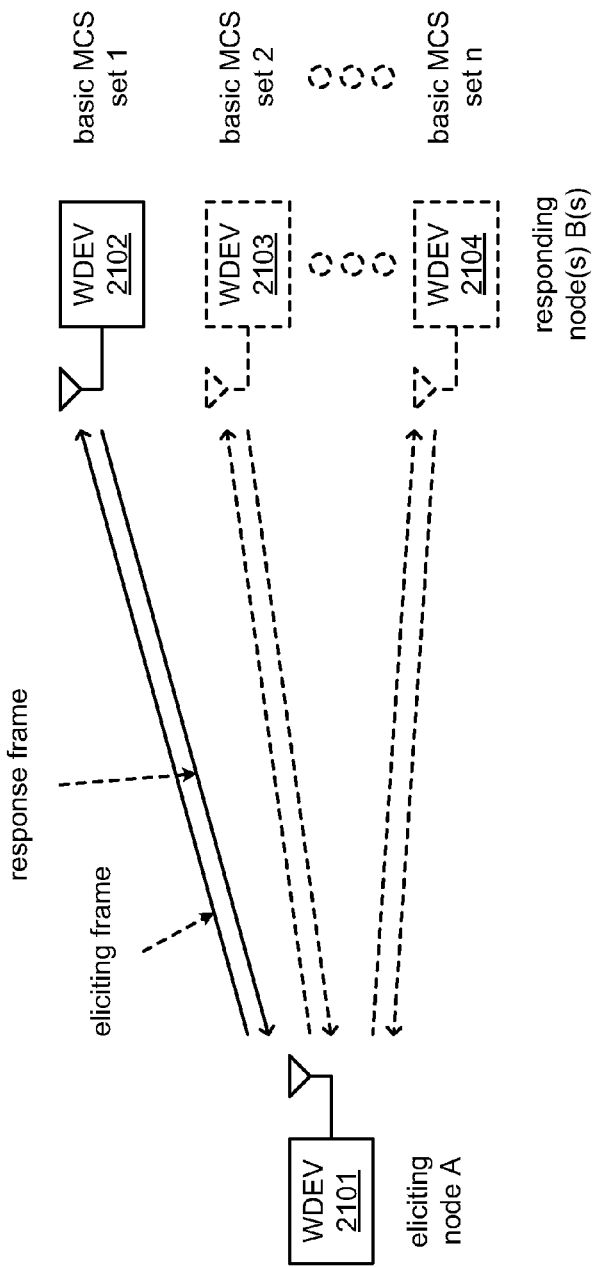
FIG. 21 illustrates an embodiment of response MCS selection for communications between communication devices, in accordance with eliciting node based determination.

Reduction=MOD 1, Coding 1, NSS 1
BSSBasicMCSSet empty, BSSBasicRateSet includes 24, 12, 6
STA1 TX AMPDU MCS18 (QPSK, ¾, 3)
STA2 determines that eliciting frame MCS is at or below the limit, so reduction is required
STA2 determines BA response to be 24 Mbps (16Q, ½, 1) before reduction
Reduction gives BPSK, ½, 1=>6 Mbps FIG. 21 illustrates an embodiment of response MCS selection for communications between communication devices, in accordance with eliciting node based determination. As can be seen with respect to this diagram, at least two different devices, depicted by reference numerals 2101 and 2102, are implemented to effectuate communications there between. In certain embodiments, additional devices, such as depicted by 2103 through 2104 may also be implemented to effectuate communications with the other devices as well.

As may be seen with respect to this diagram, different respective devices may operate in accordance with different respective basic MCS sets. For example, a first basic MCS set may correspond to a first device, while a second basic MCS set may correspond to a second device, and so on. It is noted that more than one device may be included within a group that operates in accordance with a given basic MCS set. Generally speaking, different basic MCS sets may be employed for different nodes within the system. Consideration regarding response frame MCS selection, as performed by an eliciting node A, may consider, at least in part, the capability of each respective node, communication link, etc. That is to say, there may be a number of communication links between an eliciting node and different respective responding nodes. The determination of which devices will be associated with which respective basic MCS set may be made during Association or after. For example, a management frame exchange may be made between an eliciting node and a given responding node to determine the basic MCS set to be employed for a given responding node. Also, the classification of the respective responding nodes with one or more basic MCS sets may be effectuated dynamically; for example, a given device may at one time be associated with a first basic MCS set and be associated with a second basic MCS set of the second time.

In accordance with this embodiment of response frame MCS selection as being made at an eliciting node A, and eliciting node may be implemented as an access point (AP) operative to communicate a basic MCS set that is selected to ensure that response transitions from all of the respective responding nodes in the basic services set (BSS) may be effectively and properly received by the eliciting node/AP. For example in an embodiment in which the eliciting node operates as if it is an AP, it may operate to remove those relatively higher MCS values from the basic MCS set to disallow the use of those MCS values in response transmissions.

Alternatively in an embodiment in which the eliciting node operates as if it is an AP, they can provide different respective basic MCS sets for the different respective responding nodes. Those responding nodes with relatively lower transmit power capability may be assigned to a basic MCS set that has relatively lower MCSs (e.g., operates in accordance with relatively lower order modulations, lower rates, etc.). In certain situations, when operating in accordance with this embodiment, respective, explicitly delivered basic MCS sets may be transmitted respectively to the individual responding nodes. For example, a first basic MCS set may be delivered from the eliciting node to a first responding node, a second basic MCS set may be delivered from the eliciting node to a second responding node, etc. Those responding nodes that receive such a basic (and particularly tailored/specific) MCS set corresponding to that responding node may operate by ignoring a broadcast basic MCS set that may be transmitted by the eliciting node/AP. For example, while the eliciting node/AP may normally transmit or broadcast a basic MCS set to the respective responding nodes within the system, if a given responding node has already received a specific/particular basic MCS set for use, then that given responding node may ignore the broadcast basic MCS set. It is noted that any such basic MCS set may be sent to a given responding node at a time.

Also, it is noted that such an embodiment may include a means by which the individualized basic MCS sets may be rescinded from those respective responding nodes to which they have been assigned. For example, there may be an instance in which the eliciting node/AP desires to return all of the responding nodes operate within a common basic MCS set, rather than selectively and differentially operating certain of the responding nodes in accordance with different and respective basic MCS sets. To effectuate such a refresh/re-initialization operation, eliciting node may tell one or more of the responding nodes to revert to a common, broadcast basic MCS set. Alternatively, there may be instances in which the respective responding nodes each have information related to some basic MCS set, and the eliciting node may communicate to one or more of the responding nodes to revert to that basic MCS set (e.g., such as by setting a particular bit within a given communication from the eliciting node to the one or more responding notes).

Figure 22:
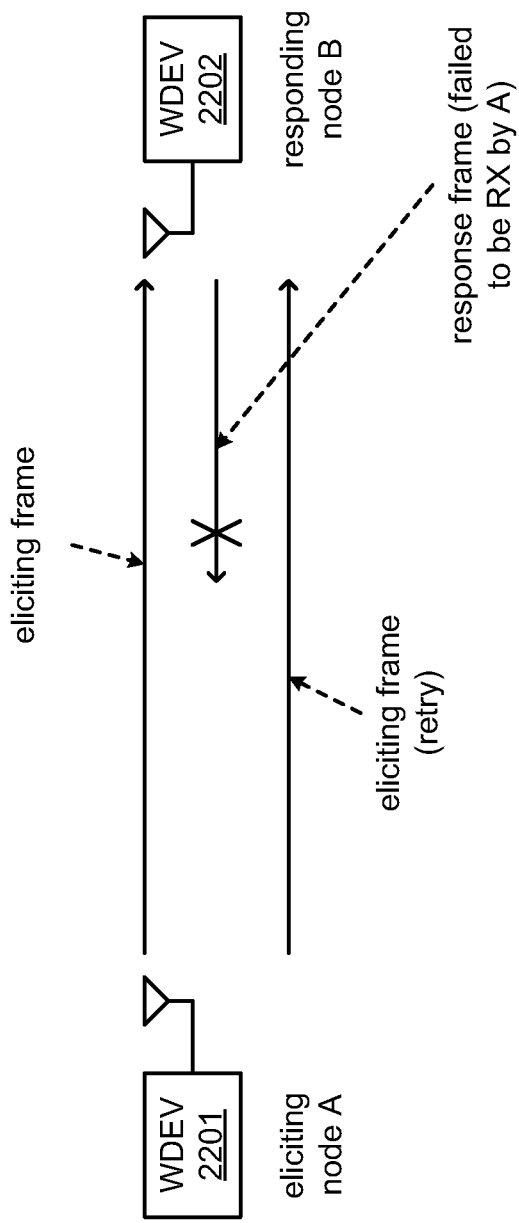
FIG. 22 illustrates an embodiment of response MCS selection for communications between communication devices, in accordance with responding node based determination and using at least one retry.

FIG. 22 illustrates an embodiment of response MCS selection for communications between communication devices, in accordance with responding node based determination and using at least one retry. As can be seen with respect to this diagram, at least two different devices, depicted by reference numerals 2201 and 2202, are implemented to effectuate communications there between.

In even other embodiments, the response frame NCS selection may be made by a responding node itself. That is to say, response frame MCS selection may be performed at the responding node, autonomously determined by the responding node without necessarily being instructed by the eliciting node.

For example, the response frame MCS used for transmissions to a given node may be reduced if the retries of eliciting frames are received from a node in the retry eliciting frames were previously successfully received that responding node and acknowledged by the responding node. For example, as also analogously described above with respect to other embodiments, a retry implies that a response, such as an acknowledgment, was lost during transmission. This loss may have been caused by an inappropriate MCS selection for the given communication link. A responding node may be implemented to include capability to differentiate responses that are lost due to collision as opposed to those that may have been lost due to an inappropriate MCS selection. For example, the loss of a communication associated with an inappropriate MCS selection may be differentiated when a response, such as an acknowledgment, is lost within a transmit opportunity (TXOP) that has included at least one complete frame exchange.

Also, there may be certain situations in which a suggested response MCS may not be able to be supported by a given communication link. For example, examination of transmit power reported by an eliciting node A being greater than the transmit power of a responding node B may provide the determination that a suggested response MCS may not be appropriate. Also, examination of the respective transmit powers by the respective nodes, A and B (and determining that the transmit power of A is greater than that of B), and the link margin (if known) combined with the response node transmit power may not necessarily support the suggested response MCS.

For example, when the difference in the respective transmit powers exceeds the difference in the minimum signal-to-noise ratio (SNR) required between the eliciting frame MCS in the response frame MCS, then a reduction in the response frame MCS may potentially be appropriate. The amount of reduction of the MCS may be based upon the difference in respective transmit powers of the respective nodes, A and B, and the estimated link margin. There may be certain situations in which a relatively lower responding node transmit power may still be sufficient/adequate for a given communication link with excellent margin, such as if both of the respective devices are receiving packets with a reasonably good probability (e.g., an acceptable BER/PER).

Figure 23:
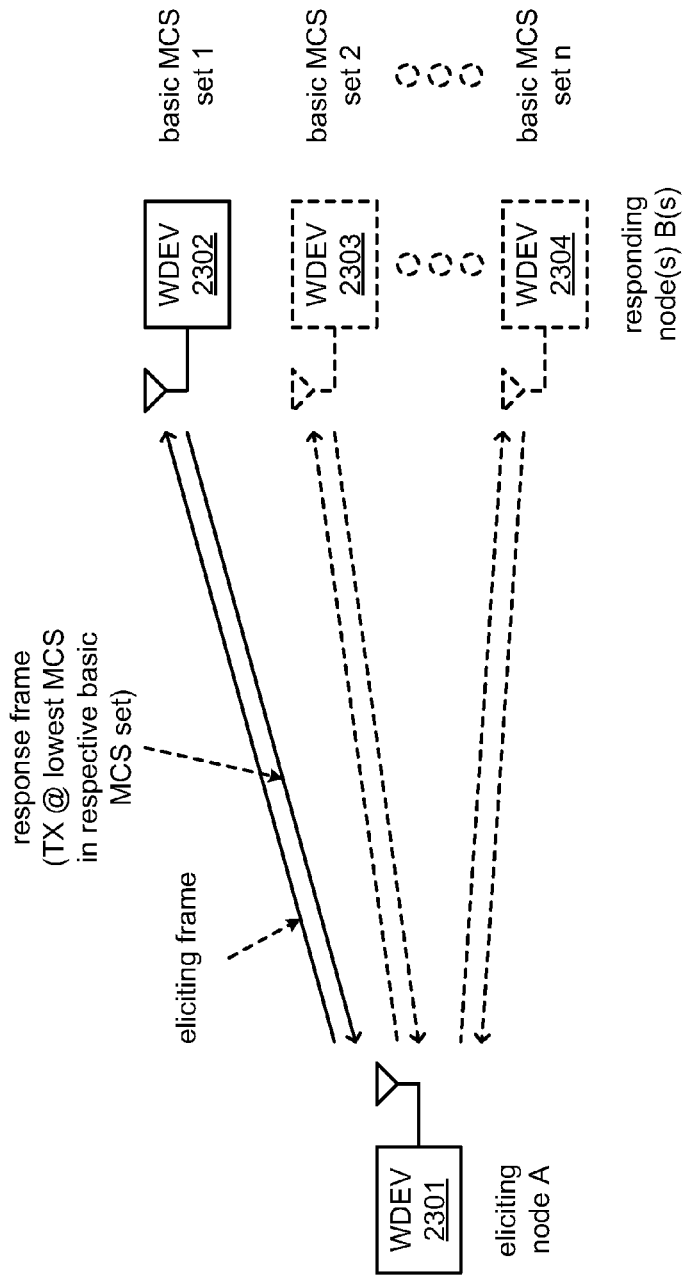
FIG. 23 illustrates an embodiment of response MCS selection for communications between communication devices, in accordance with responding node based determination and using a lowest MCS in a basic MCS set.

FIG. 23 illustrates an embodiment of response MCS selection for communications between communication devices, in accordance with responding node based determination and using a lowest MCS in a basic MCS set. As can be seen with respect to this diagram, at least two different devices, depicted by reference numerals 2301 and 2302, are implemented to effectuate communications there between. In certain embodiments, additional devices, such as depicted by 2303 through 2304 may also be implemented to effectuate communications with the other devices as well.

Even other embodiments in which response frame MCS selection is performed at the responding node, the response frame can simply be transmitted at a lowest MCS. For example, within a basic MCS set, a response frame may simply be transmitted using the lowest possible MCS thereof. For example, as a simple alternative, to avoid the necessity determining relative transmit power values, estimation of link margin, examination of retries, etc., a default manner by which a response frame may be transmitted can be used. One such default banner may include transmitting a response frame at the lowest MCS within a basic MCS set.

It is noted that a given basic MCS set may be modified to include a given lowest MCS. For example, in an embodiment in which multiple responding nodes operate in accordance with multiple respective basic MCS sets, if it is desired that response frames should be provided at a common, lowest MCS for more than one responding node within more than one basic MCS set, one or more of the basic MCS sets may be modified to include such a common, lowest MCS (e.g., such that all of the respective basic MCS sets include this common, lowest MCS).

A responding node can simply use such a reduced MCS for all response transmissions. Such a reduced MCS may be viewed relatively as being compared to the requirement to use the highest MCS from the basic MCS set that is less than or equal to the MCS of the eliciting frame.

Figure 24:
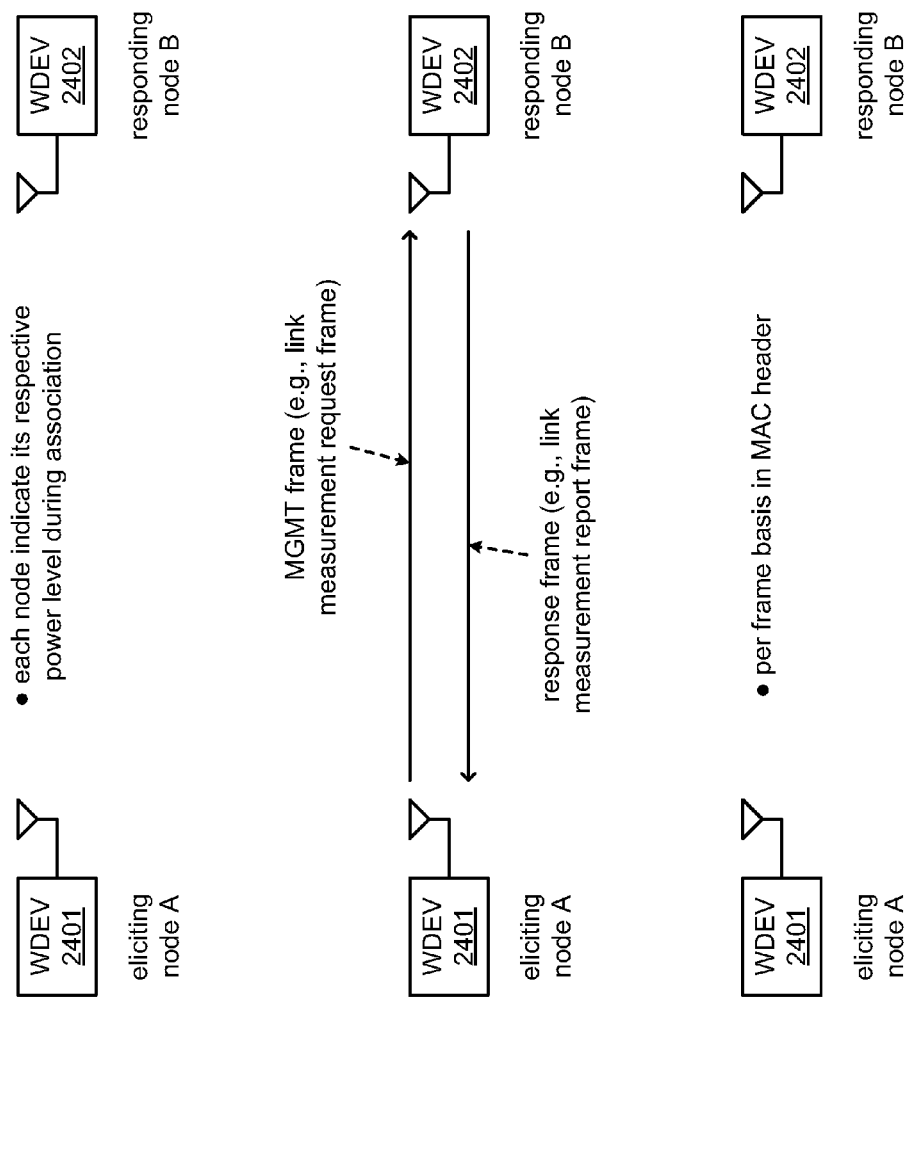
FIG. 24 illustrates an embodiment of power difference indication between communication devices.

FIG. 24 illustrates an embodiment of power difference indication between communication devices. As can be seen with respect to this diagram, at least two different devices, depicted by reference numerals 2401 and 2402, are implemented to effectuate communications there between.

As described elsewhere herein with respect other diagrams and/or embodiments, it is noted that the respective transmit power levels of different respective devices within the system may be at least one criterion employed for response frame MCS selection. For example, with respect to power difference indication, each respective node may indicate the respective transmit power level it is using during Association.

In alternative embodiments, some type of management frame exchange may be made between two respective devices. One such example is in accordance with Link Measurement Request and Report functionality (e.g., REVmb. 8.5.7.4). For example, a Link Measurement Request frame uses the Action body format and this transmitted via a wireless station (STA) to request another STA to respond with a Link Measurement Report frame to enable measurement of link path loss and estimation of link margin. The format of the Action field in the Link Measurement Request frame is shown in FIG. 8-390 (Link Measurement Request frame Action field format). The reader is also referred to section 8.5.7.5 Link Measurement Report Frame Format.

In even alternative embodiments, and is noted that indication of respective transmit power level of a given node may be provided on a per frame basis (e.g., dynamically on a per frame basis). Such indication of transmit power level may be included in a MAC header.

Figure 25:
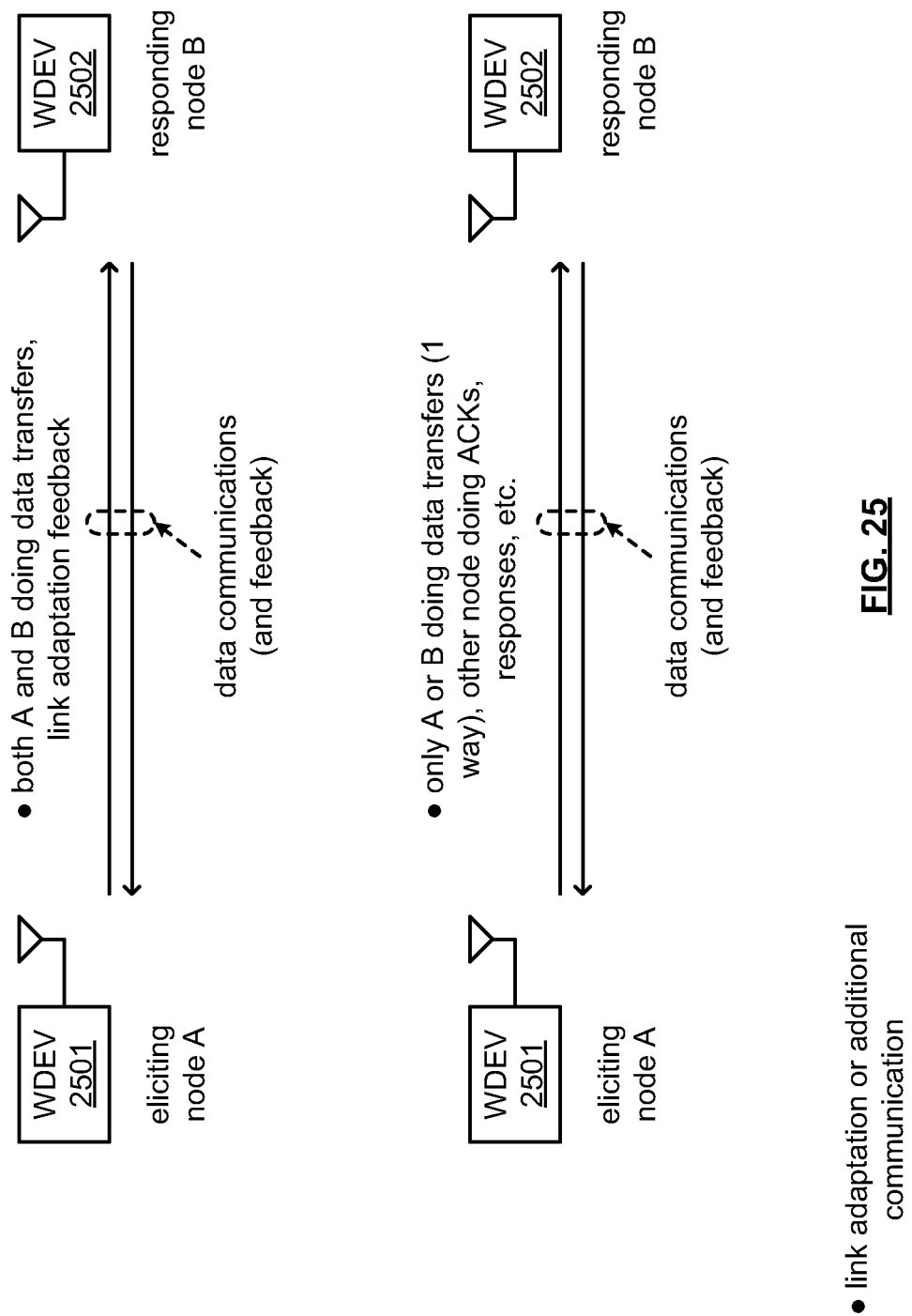
FIG. 25 illustrates an embodiment of response MCS selection for communications between communication devices, in accordance with MCS selection using channel/MCS feedback.

FIG. 25 illustrates an embodiment of response MCS selection for communications between communication devices, in accordance with MCS selection using channel/MCS feedback. As can be seen with respect to this diagram, at least two different devices, depicted by reference numerals 2501 and 2502, are implemented to effectuate communications there between.

As may be seen with respect to this diagram, there may be instances in which data communications may be effectuated in both directions of a given communication link, such as between the eliciting node A and a responding node B. In other words, both of the respective nodes, A and B, made effectuate data transmission to the other node. In the instance that data communications are in fact being made in both directions, then both of the respective devices at each end of the communication link can use link adaptation. Generally speaking, if data communications are being made in both directions, such information and functionality is related to link adaptation may be available and then can be used.

However, there may be some instances in which communications of data are made in only one direction, such as from eliciting node A to responding node B, and responding node B is providing only a response frame, such as an acknowledgment back to the eliciting node A (but is not providing data frames to the eliciting node A). In such instances, an additional communication may be made from the responding node B to the eliciting node A to assist in accordance with link adaptation functionality.

Generally speaking, link adaptation may be used to select the MCS on the forward link (e.g., 9.27 Link adaptation of REVmb).

An approach similar to forward link adaptation may also be used to as described above, if there is both forward and reverse traffic, given indication link, link adaptation feedback (e.g., MCS feedback) may be available for the data traffic being transmitted in the same direction as a response frames. The same link adaptation feedback may be used to select the MCS for the response frame. This can provide for a greater safety margin with respect to the response frame. That is to say, a relatively lower MCS may be selected for the response frame as compared to data communications provided along the same direction. In addition, any difference between the MCS employed for data and responses (e.g., a safety margin there between) may be indicated during association.

FIG. 26, FIG. 27A, FIG. 27B, FIG. 28, FIG. 29A, and FIG. 29B illustrate various embodiments of methods performed by one or more communication devices.

Referring to method 2600 of FIG. 26, the method 2600 begins by receiving an eliciting frame from at least one additional communication device (e.g., via at least one antenna of a communication device), as shown in a block 2610. The method 2600 continues by determining a first modulation coding set (MCS) associated with the eliciting frame, as shown in a block 2620.

Based on at least the first MCS, the method 2600 then operates by selecting a second MCS and generating a response frame having the second MCS, as shown in a block 2630. The method 2600 continues by transmitting the response frame to the at least one additional communication device (e.g., via the at least one antenna of a communication device), as shown in a block 2640.

Figure 27B:
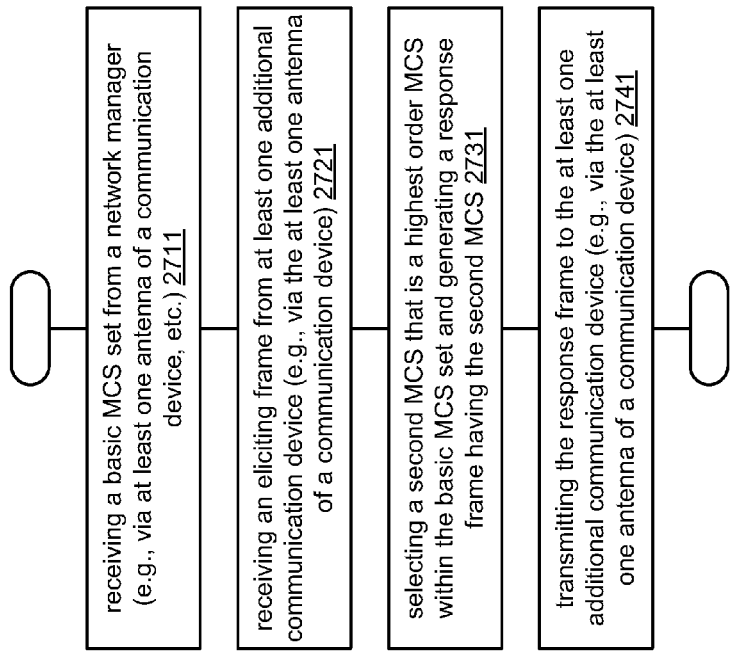
Figure 27A:
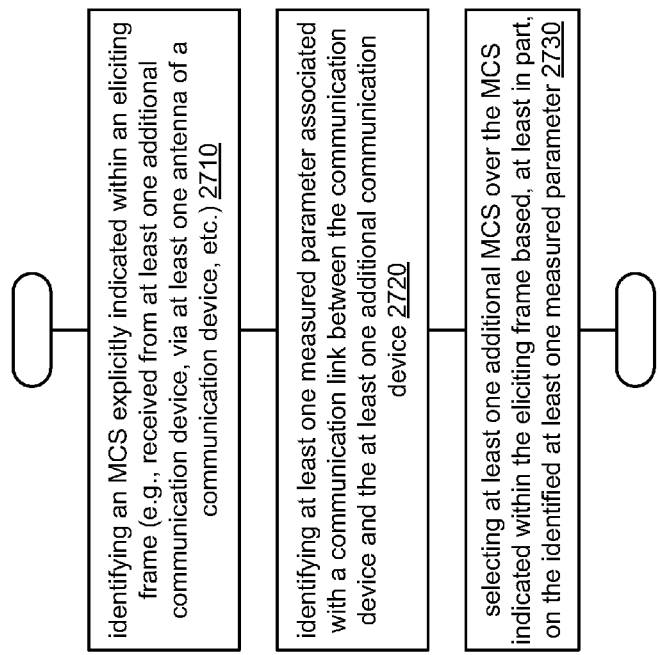

Referring to method 2700 of FIG. 27A, the method 2700 begins by identifying an MCS explicitly indicated within an eliciting frame (e.g., received from at least one additional communication device, via at least one antenna of a communication device, etc.), as shown in a block 2710. The method 2700 continues by identifying at least one measured parameter associated with a communication link between the communication device and the at least one additional communication device, as shown in a block 2720.

The method 2700 then operates by selecting at least one additional MCS over the MCS indicated within the eliciting frame based, at least in part, on the identified at least one measured parameter, as shown in a block 2730.

Referring to method 2701 of FIG. 27B, the method 2701 begins by receiving a basic MCS set from a network manager (e.g., via at least one antenna of a communication device, etc.), as shown in a block 2711. The method 2701 continues by receiving an eliciting frame from at least one additional communication device (e.g., via the at least one antenna of a communication device), as shown in a block 2721.

The method 2701 then operates by selecting a second MCS that is a highest order MCS within the basic MCS set and generating a response frame having the second MCS, as shown in a block 2731. The method 2701 continues by transmitting the response frame to the at least one additional communication device (e.g., via the at least one antenna of a communication device), as shown in a block 2741.

Referring to method 2800 of FIG. 28, the method 2800 begins by determining a first MCS associated with an eliciting frame, as shown in a block 2810. The method 2800 continues by determining if the first MCS associated with an eliciting frame is below L (e.g., a limit parameter), as shown in a decision block 2820.

If it is determined in the decision block 2820 that the first MCS is below L, then the method 2800 then operates by selecting a second MCS that is relatively of lower order below the first MCS based on R (e.g., a reduction parameter) for use in a response frame, as shown in a block 2830.

Alternatively, if it is determined in the decision block 2820 that the first MCS is not below L, then the method 2800 then operates by selecting the second MCS for use in a response frame in accordance with other manner, as shown in a block 2840.

Referring to method 2900 of FIG. 29A, the method 2900 begins by transmitting a first basic MCS set to a first communication device, as shown in a block 2910. The method 2900 continues by transmitting a second basic MCS set to a second communication device, as shown in a block 2920.

The method 2900 then operates by receiving a first signal from the first communication device in accordance with an MCS that is a highest order MCS within the first basic MCS set, as shown in a block 2930. The method 2900 continues by receiving a second signal from the second communication device in accordance with an MCS that is a highest order MCS within the second basic MCS set, as shown in a block 2940.

Referring to method 2901 of FIG. 29B, the method 2901 begins by transmitting a first eliciting frame to at least one additional communication device (e.g., via at least one antenna of a communication device) in accordance with a first MCS, as shown in a block 2911. The method 2901 continues by failing to receive a response frame after a period of time, as shown in a block 2921.

The method 2901 then operates by transmitting a second eliciting frame to at least one additional communication device (e.g., via at least one antenna of a communication device) in accordance with a second MCS of relatively lower order than the first MCS, as shown in a block 2931. The method 2901 continues by receiving a response frame from the at least one additional communication device in accordance with the second MCS or a third MCS of relatively lower order than the second MCS, as shown in a block 2941.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |

TABLE 5-continued

Channelization for Table 4

| Channel | Frequency (MHz) | Country | Channel | Frequency (MHz) | Country |
|---|---|---|---|---|---|
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |

TABLE 10-continued

5 GHz, with 40 MHz channels and max bit rate of 486 Mbps

| Rate | TX Antennas | ST Code Rate | Modulation | Code Rate | NBPSC |
|---|---|---|---|---|---|
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. An apparatus comprising:
a communication interface configured to receive an eliciting frame from a communication device; and
a processor configured to:
process the eliciting frame to determine a first modulation coding set (MCS) of the eliciting frame; and
based on at least the first MCS, based on at least one measured parameter associated with a communication link between the apparatus and the communication device, and based on at least one of a reduction parameter or a limit parameter that is based on an indication provided by the communication device, select a second MCS that is a highest MCS in a basic MCS set that is associated with the apparatus and the communication device, wherein the second MCS is relatively of lower order below the first MCS based on the reduction parameter when the first MCS is below the limit parameter; and
generate a response frame having the second MCS for use in a subsequent transmission to the communication device via the communication interface.

2. The apparatus of claim 1, wherein the processor is further configured to:
process the eliciting frame to identify a third MCS that is explicitly indicated within the eliciting frame; and
select the second MCS over the third MCS based on at least one measured parameter associated with a communication link between the apparatus and the communication device.

3. The apparatus of claim 1, wherein the second MCS is relatively of lower order than the first MCS.

4. The apparatus of claim 1, wherein the indication provided by the communication device includes a suggested response MCS.

5. The apparatus of claim 1 further comprising:
a wireless station (STA), wherein the communication device is an access point (AP) or at least one additional STA.

6. An apparatus comprising:
a communication interface configured to receive an eliciting frame from a communication device; and
a processor configured to:
process the eliciting frame to determine a first modulation coding set (MCS) of the eliciting frame; and
based on at least the first MCS and based on at least one of a reduction parameter or a limit that is based on an indication provided by the communication device, select a second MCS and generate a response frame having the second MCS for use in a subsequent transmission to the communication device via the communication interface, wherein the second MCS is relatively of lower order below the first MCS based on the reduction parameter when the first MCS is below the limit parameter.

7. The apparatus of claim 6, wherein the processor is further configured to:
process the eliciting frame to identify a third MCS that is explicitly indicated within the eliciting frame; and
select the second MCS over the third MCS based on at least one measured parameter associated with a communication link between the apparatus and the communication device.

8. The apparatus of claim 6 further comprising:
the processor configured to select the second MCS based on at least one measured parameter associated with a communication link between the apparatus and the communication device.

9. The apparatus of claim 6, wherein the second MCS is the first MCS.

10. The apparatus of claim 6, wherein the second MCS is relatively of lower order than the first MCS.

11. The apparatus of claim 6, wherein the second MCS is a highest MCS in a basic MCS set associated with the apparatus and the communication device.

12. The apparatus of claim 6, wherein the indication provided by the communication device includes a suggested response MCS.

13. The apparatus of claim 6 further comprising:
a wireless station (STA), wherein the communication device being an access point (AP) or at least one additional STA.

14. A method execution by a communication device, the method comprising:
via a communication interface of the communication device, receiving an eliciting frame from at least one additional communication device;
processing the eliciting frame to determine a first modulation coding set (MCS) of the eliciting frame;
based on at least the first MCS and based on at least one of a reduction parameter or a limit that is based on an indication provided by the communication device, selecting a second MCS and generating a response frame having the second MCS, wherein the second MCS is relatively of lower order below the first MCS based on the reduction parameter when the first MCS is below the limit parameter; and via the communication interface of the communication device, transmitting the response frame to the at least one additional communication device.

15. The method of claim 14 further comprising:
processing the eliciting frame to identify a third MCS that is explicitly indicated within the eliciting frame; and
selecting the second MCS over the third MCS based on at least one measured parameter associated with a communication link between the communication device and the at least one additional communication device.

16. The method of claim 14 further comprising:
selecting the second MCS based on at least one measured parameter associated with a communication link between the communication device and the at least one additional communication device.

17. The method of claim 14, wherein the second MCS is relatively of lower order than the first MCS.

18. The method of claim 14, wherein the second MCS is a highest MCS in a basic MCS set associated with the apparatus and the communication device.

19. The method of claim 14, wherein the indication provided by the communication device includes a suggested response MCS.

20. The method of claim 14, wherein the communication device being a wireless station (STA), and the at least one additional communication device being an access point (AP) or at least one additional STA.

* * * * *